US011661922B2

(12) United States Patent
Aubrion et al.

(10) Patent No.: US 11,661,922 B2
(45) Date of Patent: May 30, 2023

(54) LIGHTNING RECEPTOR BRACKET

(71) Applicant: LM WIND POWER INTERNATIONAL TECHNOLOGY II APS, Kolding (DK)

(72) Inventors: Mathilde Aubrion, Kolding (DK); Boas Eiriksson, Kolding (DK)

(73) Assignee: LM WIND POWER INTERNATIONAL TECHNOLOGY II APS, Kolding (DK)

(*) Notice: Subject to any disclaimer, the term of this patent is extended or adjusted under 35 U.S.C. 154(b) by 56 days.

(21) Appl. No.: 17/268,241

(22) PCT Filed: Aug. 14, 2019

(86) PCT No.: PCT/EP2019/071783
§ 371 (c)(1),
(2) Date: Feb. 12, 2021

(87) PCT Pub. No.: WO2020/035520
PCT Pub. Date: Feb. 20, 2020

(65) Prior Publication Data
US 2021/0180570 A1 Jun. 17, 2021

(30) Foreign Application Priority Data
Aug. 15, 2018 (EP) .................. 18189139

(51) Int. Cl.
*F03D 80/30* (2016.01)
*F03D 1/06* (2006.01)
(52) U.S. Cl.
CPC .......... *F03D 80/30* (2016.05); *F03D 1/0675* (2013.01); *F05B 2240/30* (2013.01)

(58) Field of Classification Search
CPC ....... F03D 80/30; F03D 1/0675; F03D 1/0683
See application file for complete search history.

(56) References Cited

U.S. PATENT DOCUMENTS 8,191,255 B2 * 6/2012 Kristensen ............. F03D 80/30
29/889
8,914,176 B2 * 12/2014 Zhamu ................... B60L 53/20
701/22

(Continued)

FOREIGN PATENT DOCUMENTS

CN 106 626 182 A 5/2017
EP 2 110 552 A1 10/2009

(Continued)

OTHER PUBLICATIONS

Machine Translation of EP 2675030A1 [retrieved on Sep. 3, 2023], Retrieved from: Espacenet. (Year: 2023).*

(Continued)

*Primary Examiner* — Eric J Zamora Alvarez
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

Disclosed is a support element for a lightning protection system of a wind turbine blade comprising: a first surface configured to face towards the suction side or the pressure side of the wind turbine blade; a second surface opposite the first surface; a root side surface configured to face towards the root of the wind turbine blade; and a tip side surface configured to face towards the tip of the wind turbine blade; wherein the first surface comprises a first receptor base recess configured to receive a first receptor base for coupling with a first receptor of the lightning protection system.

17 Claims, 20 Drawing Sheets

(56) References Cited

U.S. PATENT DOCUMENTS

| | | | | |
|---|---|---|---|---|
| 10,156,226 B2* | 12/2018 | Bech | ............... | F03D 80/30 |
| 10,648,456 B2* | 5/2020 | Shain | ............... | F03D 80/30 |
| 10,669,996 B2* | 6/2020 | Whitehouse | ......... | F03D 1/0675 |
| 10,883,479 B2* | 1/2021 | Whitehouse | ......... | F03D 1/0675 |
| 11,118,571 B2* | 9/2021 | Dahl | ............... | F03D 80/30 |
| 11,319,933 B2* | 5/2022 | Sutton | ............ | F03D 1/0675 |
| 2007/0081900 A1* | 4/2007 | Nies | ............... | B29C 70/545 |
| | | | | 416/224 |
| 2013/0280087 A1* | 10/2013 | Appleton | ......... | B29C 70/603 |
| | | | | 416/241 A |
| 2014/0341738 A1* | 11/2014 | Bech | ............... | F03D 80/30 |
| | | | | 29/889.7 |
| 2015/0044572 A1* | 2/2015 | Hucker | ........... | H01M 50/46 |
| | | | | 429/231.95 |
| 2016/0258423 A1* | 9/2016 | Whitehouse | ......... | F03D 1/0675 |
| 2020/0056596 A1* | 2/2020 | Christiansen | ......... | B29C 70/48 |

FOREIGN PATENT DOCUMENTS

| | | | |
|---|---|---|---|
| EP | 2675030 A1 * | 12/2013 | ............ F03D 80/30 |
| EP | 3 058 220 A1 | 8/2016 | |
| WO | 02/48546 A1 | 6/2002 | |
| WO | 2008/101506 A2 | 8/2008 | |
| WO | 2018/101632 A1 | 6/2018 | |

OTHER PUBLICATIONS

International Search Report dated Sep. 5, 2019 for International application No. PCT/EP2019/071783.

* cited by examiner

LIGHTNING RECEPTOR BRACKET

This is a National Phase Application filed under 35 U.S.C. 371 as a national stage of PCT/EP2019/071783, filed Aug. 14, 2019, an application claiming the benefit of European Application No. 18189139.1, filed Aug. 15, 2018, the content of each of which is hereby incorporated by reference in its entirety.

The present disclosure relates to a bracket for supporting a lightning protection component, such as a lightning receptor and/or lightning cables of a wind turbine blade.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a metallic lightning arrester that is able to connect a lightning current to earth.

A wind turbine blade is typically assembled by a number of components. For example, a typical wind turbine blade is manufactured by moulding individual shell halves, shear webs etc.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

Lightning receptors may be added to the wind turbine blade after assembling the two blade parts. For example, by drilling a hole through the shell in order to gain access to a bracket inside the blade, which is connected to a down conducting cable. Such a bracket may be a metal assembly being connected to a shear web. See for example, EP 1 664 528 B1.

SUMMARY

It is an object of the present disclosure to provide elements and methods for supporting and/or installing receptors of a lightning protection system in a more advantageous way.

Accordingly, a support element, such as a support element for a lightning protection system of a wind turbine blade extending from a root to a tip, the wind turbine blade comprising a root region, an airfoil region with the tip, a pressure side, a suction side and a chord line extending between a leading edge and a trailing edge, is disclosed. The support element being configured to support one or more elements of the lightning protection system, such as one or more receptor bases, e.g. in the airfoil region of the wind turbine blade.

The support element comprises a first surface configured to face towards the suction side or the pressure side of the wind turbine blade. The first surface has a leading first edge and a trailing first edge opposite the leading first edge. The first surface has a tip first edge and a root first edge opposite the tip first edge.

The support element comprises a second surface opposite the first surface. The second surface has a leading second edge and a trailing second edge opposite the leading second edge. The second surface has a tip second edge and a root second edge opposite the tip second edge.

The support element comprises a root side surface configured to face towards the root of the wind turbine blade and extending between the root first edge and the root second edge.

The support element comprises a tip side surface configured to face towards the tip of the wind turbine blade and extending between the tip first edge and the tip second edge.

The first surface comprises a first receptor base recess configured to receive a first receptor base for coupling with a first receptor of the lightning protection system.

Also disclosed is a method for supporting one or more elements of a lightning protection system in a wind turbine blade extending from a root to a tip. The wind turbine blade comprises a root region, an airfoil region with the tip, a pressure side, a suction side and a chord line extending between a leading edge and a trailing edge.

The method comprises providing a support element, such as the support element as disclosed above.

The support element comprises a first surface configured to face towards the suction side or the pressure side of the wind turbine blade. The first surface has a leading first edge and a trailing first edge opposite the leading first edge. The first surface has a tip first edge and a root first edge opposite the tip first edge.

The support element comprises a second surface opposite the first surface. The second surface has a leading second edge and a trailing second edge opposite the leading second edge. The second surface has a tip second edge and a root second edge opposite the tip second edge.

The support element comprises a root side surface configured to face towards the root of the wind turbine blade and extends between the root first edge and the root second edge.

The support element comprises a tip side surface configured to face towards the tip of the wind turbine blade. The tip surface extends between the tip first edge and the tip second edge.

The first surface comprises a first receptor base recess configured to receive a first receptor base for coupling with a first receptor.

The method comprises inserting a first receptor base in the first receptor base recess of the support element.

The method comprises positioning the support element in an internal cavity of the wind turbine blade between the pressure side and the suction side. The support element may be glued to an element of the wind turbine blade. The support element may be glued to the trailing edge shear web. The support element may be glued to the pressure side of the blade. The support element may be glued to the suction side of the blade. The support element may be glued to one or more of the trailing edge shear web, the pressure side of the wind turbine blade, and/or the suction side of the wind turbine blade.

The method comprises providing a hole through the pressure side and/or the suction side to access the first receptor base located in the support element. The hole may be provided by drilling through the wind turbine blade, such as a shell of the wind turbine blade, such as a shell of the pressure side and/or the suction side. Providing the hole may include providing a cavity in the first receptor base and/or the second receptor base. Alternatively, providing the hole may include providing a through hole in the first receptor base and/or the second receptor base. Providing the hole may comprise providing a threaded hole, e.g. a threaded through hole or a threaded cavity, in the first receptor base and/or the second receptor.

The method comprises connecting the first receptor to the first receptor base through the hole. Additionally or alternatively, the method may comprise connecting the second receptor to the second receptor base.

The first receptor and the first receptor base may engage in a threaded configuration. For example, the first receptor may comprise an outer thread configured to engage an inner thread of the first receptor base, e.g. an inner thread being provided in providing the hole through the pressure side and/or the suction side. The second receptor and the second receptor base may engage in a threaded configuration. For example, the second receptor may comprise an outer thread configured to engage an inner thread of the second receptor base, e.g. an inner thread being provided in providing the hole through the pressure side and/or the suction side.

Also disclosed is a wind turbine blade extending from a root to a tip. The wind turbine blade comprises a root region, an airfoil region with the tip, a pressure side, a suction side and a chord line extending between a leading edge and a trailing edge. The wind turbine blade comprises a support element, such as the support element as disclosed above. The support element is configured to support one or more elements of the lightning protection system.

The support element comprises a first surface configured to face towards the suction side or the pressure side of the wind turbine blade. The first surface has a leading first edge and a trailing first edge opposite the leading first edge. The first surface has a tip first edge and a root first edge opposite the tip first edge.

The support element comprises a second surface opposite the first surface. The second surface has a leading second edge and a trailing second edge opposite the leading second edge. The second surface has a tip second edge and a root second edge opposite the tip second edge.

The support element comprises a root side surface configured to face towards the root of the wind turbine blade and extends between the root first edge and the root second edge.

The support element comprises a tip side surface configured to face towards the tip of the wind turbine blade and extends between the tip first edge and the tip second edge.

The first surface comprises a first receptor base recess configured to receive a first receptor base for coupling with a first receptor of the lightning protection system.

It is an advantage of the present disclosure that a support element is provided which is light weight, easy to position in the wind turbine blade, and does not need to be fixed to the shear web by drilling through the shear web, potentially compromising structural strength of the shear web. Thus, the disclosure may provide for increased strength and reduced likelihood of mechanical failure of the shear webs, as well as faster assembly of the blade. The support element supports the cables in communication with the receptor and/or receptor base and the down conductor, thus providing for increased strength and reduced likelihood of mechanical failure of the cables and the down conductor.

The support element may comprise a plurality of receptor base recesses. For example, the first surface may comprise a plurality of first receptor base recesses, including the first receptor base recess, configured to receive first receptor bases for coupling with first receptors of the one or more receptors. The second surface may comprise a second receptor base recess configured to receive a second receptor base for coupling with a second receptor of the one or more receptors. Alternatively or additionally, the second surface may comprise one or more second receptor base recesses, such as a plurality of second receptor base recesses, including the second receptor base recess, configured to receive second receptor bases for coupling with second receptors of the one or more receptors.

The first surface may comprise a first primary receptor cable slot. The first surface may comprise one or more first receptor cable slots, such as a first plurality of receptor cable slots. The first plurality of receptor cable slots may include the first primary receptor cable slot. The first primary receptor cable slot may be configured to receive at least a primary part of a first receptor cable for coupling the first receptor base with a down conductor cable.

The first primary receptor cable slot may be in communication with the first receptor base recess of the support element. For example, the first receptor base recess may be in communication with the first primary receptor cable slot.

The first primary receptor cable slot may extend from a first primary cable point to a first secondary cable point, e.g. in a direction perpendicular to the leading first edge. Alternatively, the first primary receptor cable slot may extend from the first primary cable point to the first secondary cable point in a direction forming a first primary slot angle with the leading first edge. The first primary slot angle may be between 20-90 degrees, such as between 30-60 degrees. For example, the first primary slot angle may be 45 degrees.

The second surface may comprise a second primary receptor cable slot. The second surface may comprise one or more second receptor cable slots, such as a plurality of second receptor cable slots. The plurality of second receptor cable slots may include the second primary receptor cable slot. The second primary receptor cable slot may be configured to receive at least a primary part of a second receptor cable for coupling the second receptor base with a down conductor cable.

The first primary receptor cable slot and/or the second primary receptor cable slot may have a size such that a first receptor cable or second receptor cable may be provided within the slots. For example, the first primary receptor cable slot and/or the second primary receptor cable slot may have a width between 10-20 mm.

The second primary receptor cable slot may be in communication with the second receptor base recess of the support element. For example, the second receptor base recess may be in communication with the second primary receptor cable slot.

The second primary receptor cable slot may extend from a second primary cable point to a second secondary cable point, e.g. in a direction perpendicular to the leading second edge. Alternatively, the second primary receptor cable slot may extend from the second primary cable point to the second secondary cable point in a direction forming a second primary slot angle with the leading second edge. The second primary slot angle may be between 20-90 degrees, such as between 30-60 degrees. For example, the second primary slot angle may be 45 degrees.

The support element may comprise a leading edge surface extending between the leading first edge and the leading second edge. The leading edge surface may be configured for attachment to a shear web or spar side of a spar extending between the suction side and the pressure side of the wind turbine blade. For example, the support element, such as the leading edge surface of the support element, may be configured for attachment to a trailing edge shear web or a trailing edge spar side.

The support element may be configured to be positioned in a trailing edge cavity, such as between the trailing edge and the trailing edge shear web or spar side. The support element may be shaped to fit in the trailing edge cavity, such as a specific position along the longitudinal direction of the trailing edge cavity.

The support element may comprise a trailing edge surface extending between the trailing first edge and the trailing second edge. The trailing edge surface may be configured for attachment to a shear web or spar side of a spar extending between the suction side and the pressure side of the wind turbine blade. For example, the support element, such as the trailing edge surface of the support element, may be configured for attachment to a leading edge shear web or a leading edge spar side.

The support element may be configured to be positioned in a leading edge cavity, such as between the leading edge and the leading edge shear web or spar side. The support element may be shaped to fit in the leading edge cavity, such as a specific position along the longitudinal direction of the leading edge cavity.

The leading edge surface and/or the trailing edge surface may comprise a primary down conductor slot. The primary down conductor slot may be configured to receive at least a primary part of a down conductor cable. The primary down conductor slot may have a size such that the primary part of the down conductor cable may be provided within the slot. For example, the primary down conductor slot may have a width between 15-30 mm.

The primary down conductor slot may extend from a first down conductor point to a primary down conductor point, such as on the leading edge surface and/or on the trailing edge surface. The primary down conductor slot may extend along a longitudinal axis L of the wind turbine blade from the first down conductor point to the primary down conductor point. Alternatively, the primary down conductor slot may extend along a direction from the first down conductor point to the primary down conductor point forming a primary down conductor angle with the longitudinal axis L of the wind turbine blade in a plane of the leading edge surface and/or the trailing edge surface. The primary down conductor angle may be between 10 and 45 degrees, such as between 15 and 30 degrees. For example, the primary down conductor angle may be 20 degrees.

The leading edge surface and/or the trailing edge surface may comprise a secondary down conductor slot. The secondary down conductor slot may be configured to receive at least a secondary part of a down conductor cable. The secondary down conductor slot may have a size such that the secondary part of the down conductor cable may be provided within the slot. For example, the secondary down conductor slot may have a width between 15-30 mm.

The secondary down conductor slot may extend along a direction from a first down conductor point to a secondary down conductor point, such as on the leading edge surface and/or on the trailing edge surface. The secondary down conductor slot may extend along the longitudinal axis L of the wind turbine blade from the first down conductor point to the secondary down conductor point. Alternatively, the secondary down conductor slot may extend along a direction from the first down conductor point to the secondary down conductor point forming a secondary down conductor angle with the longitudinal axis L of the wind turbine blade in a plane of the leading edge surface and/or the trailing edge surface. The secondary down conductor angle may be between 10 and 45 degrees, such as between 15 and 30 degrees. For example, the secondary down conductor angle may be 20 degrees.

The leading edge surface and/or the trailing edge surface may comprise a first secondary receptor cable slot. The leading edge surface and/or the trailing edge surface may comprise a second secondary receptor cable slot. The leading edge surface and/or the trailing edge surface may comprise a plurality of secondary receptor cable slots, e.g. including the first secondary receptor cable slot and/or the second secondary receptor cable slot. The first secondary receptor cable slot may be configured to receive at least a secondary part of a first receptor cable for coupling the first receptor base with the down conductor cable. The second secondary receptor cable slot may be configured to receive at least a secondary part of a second receptor cable for coupling the second receptor base with the down conductor cable.

The first secondary receptor cable slot and/or the second secondary receptor cable slot may have a size such that a first receptor cable or second receptor cable may be provided within the slots. For example, the first secondary receptor cable slot and/or the second secondary receptor cable slot may have a width between 10-20 mm.

The first secondary receptor cable slot may be in communication with the primary down conductor slot. Additionally or alternatively, the first secondary receptor cable slot may be in communication with the secondary down conductor slot. The second secondary receptor cable slot may be in communication with the primary down conductor slot. Additionally or alternatively, the second secondary receptor cable slot may be in communication with the secondary down conductor slot.

The support element may be made of a low weight material. The support element may be made of a foam. The support element may be made of a polymer, e.g. polyethylene, such as low density polyethylene. The support element may be made of a polymer foam. The support element may be made of low density polyethylene foam.

The support element may comprise one or more orientation pockets. The support element may comprise a first orientation pocket and/or a second orientation pocket. The support element may comprise a plurality of orientation pockets, e.g. including the first orientation pocket and/or the second orientation pocket. The first orientation pocket may be located a predetermined distance from the first receptor base recess. The second orientation pocket may be located a predetermined distance from the second receptor base recess.

The first orientation pocket and/or the second orientation pocket may be configured to receive a magnetic element, for example a first magnetic element and/or a second magnetic element. Alternatively or additionally, the first orientation pocket and/or the second orientation pocket may comprise the magnetic element, for example the first magnetic element and/or the second magnetic element. The support element may be made of a non-magnetic material and/or a material being less influenced by a magnetic field than the magnetic element, such as the first magnetic element and/or the second magnetic element.

The first orientation pocket may be provided in the first surface. The second orientation pocket may be provided in the second surface.

By providing an orientation pocket in a predetermined distance from a receptor base recess, the process of correctly providing a through hole in the blade for coupling the receptor to the receptor base may be facilitated. For example, the position of the first receptor base in the support element may be located before providing the hole through the pressure side and/or the suction side. Locating the position of the first receptor base may comprise locating a magnetic element in an orientation pocket of the support element through the pressure side and/or the suction side.

The support element may comprise a trailing edge surface extending between the trailing first edge and the trailing second edge. Alternatively, the trailing first edge may form the trailing second edge. Alternatively, the trailing first edge and the trailing second edge may form two separate edges.

At the trailing first edge and/or the trailing second edge and/or the leading first edge and/or the leading second edge, the surface of the support element may be inclined. The surface may be inclined such as to not follow the contour of the suction side and/or the pressure side. Thereby, drain cavities may be formed between these edges and the suction side and/or the pressure side. The drain cavities may be configured to allow water accumulated inside the wind turbine blade to flow in the longitudinal direction of the wind turbine blade in order to drain through drain holes. The cross section of the drain cavities may be, for example, circular, oval, rectangular or triangular.

Alternatively or additionally, the inclined surfaces of the support element may allow spacing for structural elements of the blade, such as flanges or caps of the spar or shear web.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
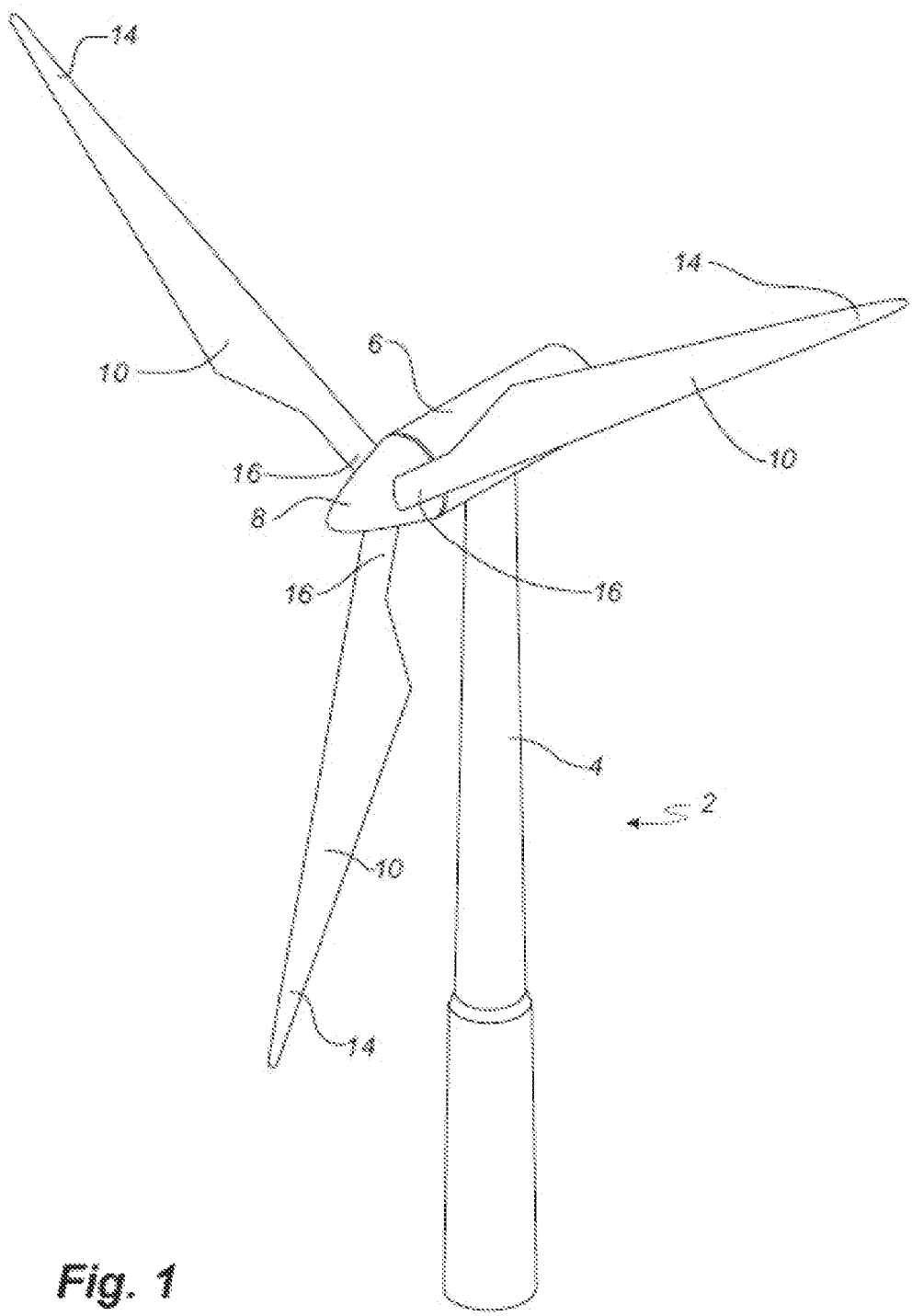
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
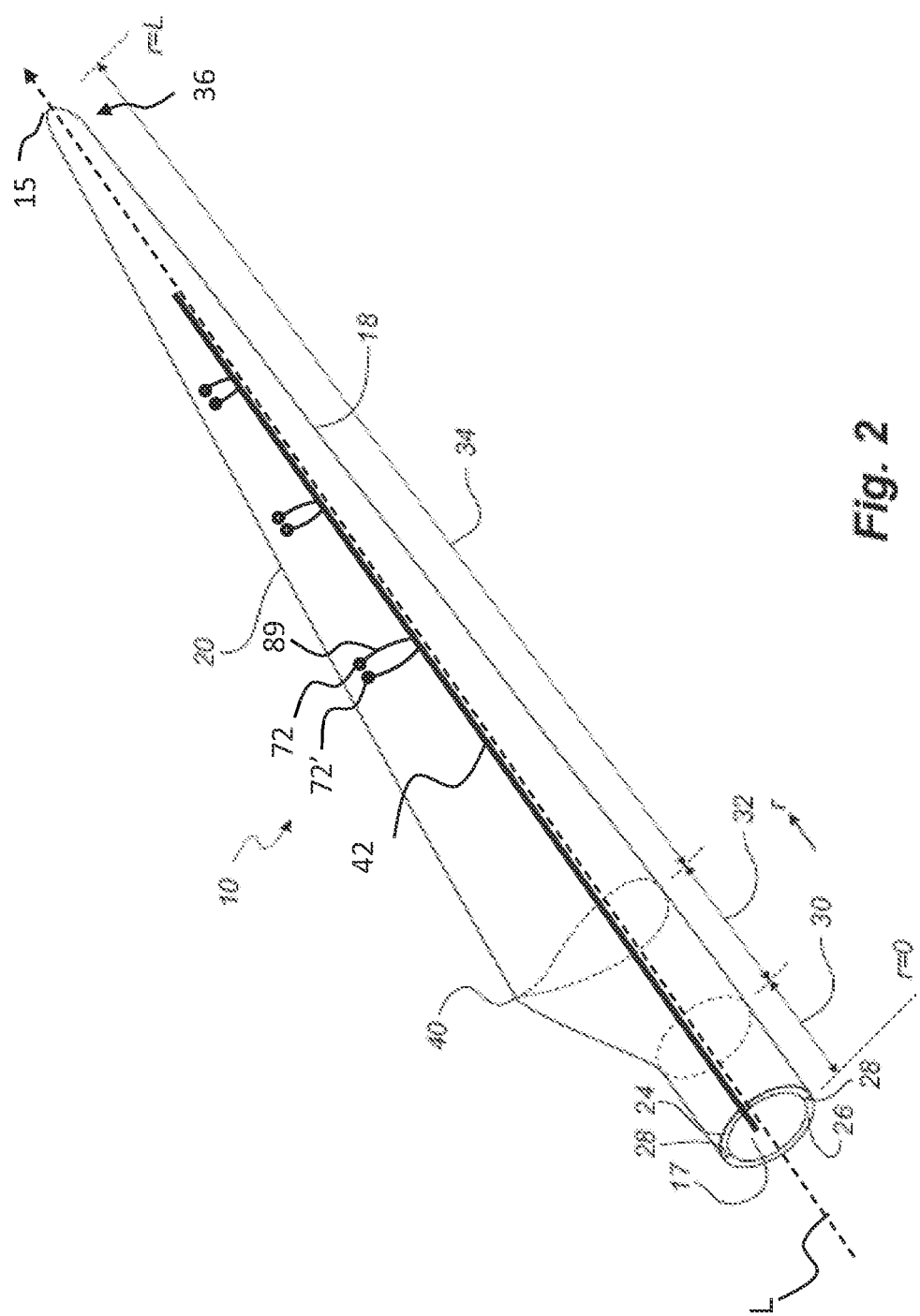
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell which may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L. One or more receptors, such as a first receptor 72 and/or a second receptor 72', are distributed along the surface of the blade, such as on the suction side 26 and/or the pressure side 24. Each of the receptors 72,72' are connected to a respective receptor cable 89. Each receptor cable 89 is connected to a down conductor 42. The down conductor 42 runs in a direction along the longitudinal axis L.

Figure 3:
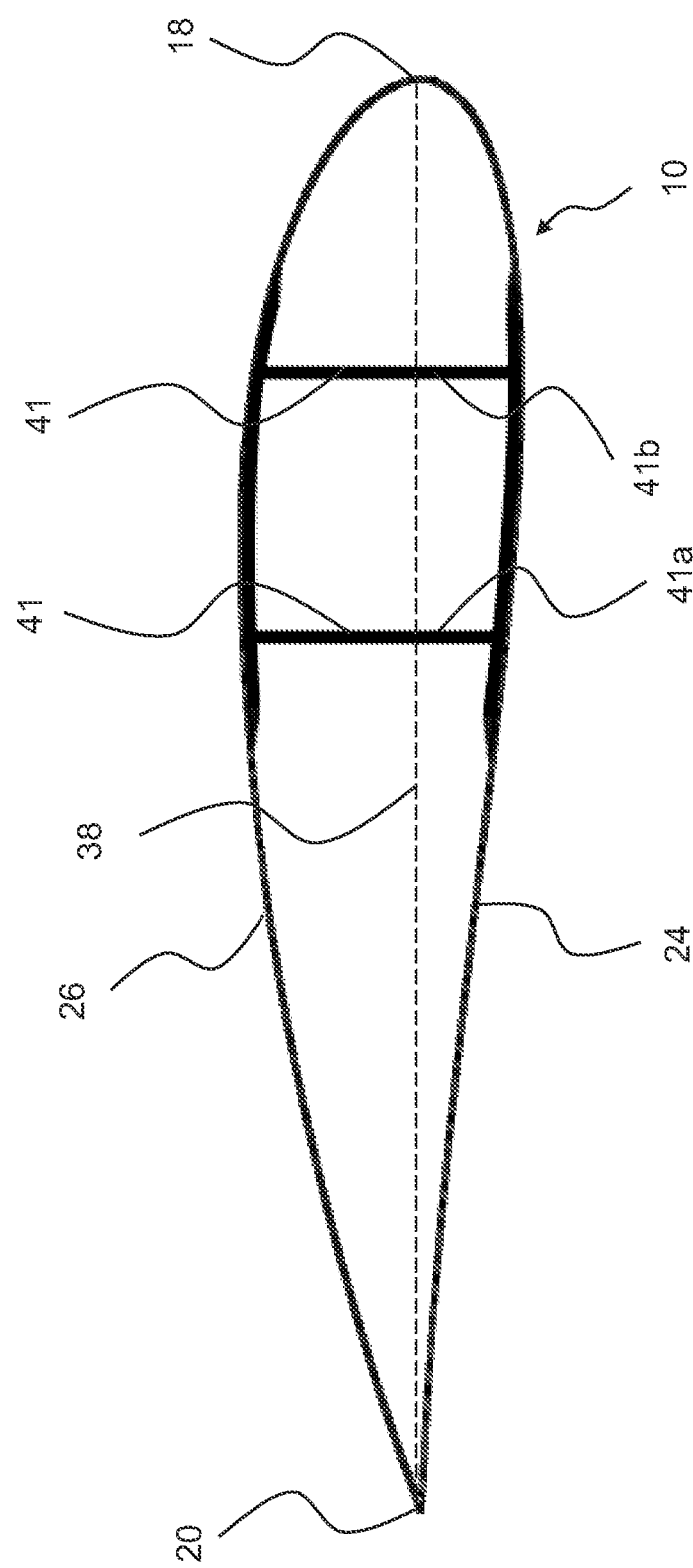
FIG. 3 is a schematic diagram illustrating a cross section of an exemplary wind turbine blade.

FIG. 3 is a schematic diagram illustrating a cross section of the airfoil region of an exemplary wind turbine blade 10, such as the wind turbine blade 10 of FIG. 2. The wind turbine blade 10 comprises a trailing edge 20, a leading edge 18, a pressure side 24, a suction side 26, shear webs 41, such as a trailing edge shear web 41a and a leading edge shear web 41b, and a chord line 38 running from the leading edge 18 to the trailing edge 20. The shear webs 41 could, in an alternative wind turbine blade, be replaced by sides of a spar. Thus, although in the following, examples are provided with reference to a wind turbine blade comprising shear webs, these could be replaced by sides of a spar.

Figure 4:
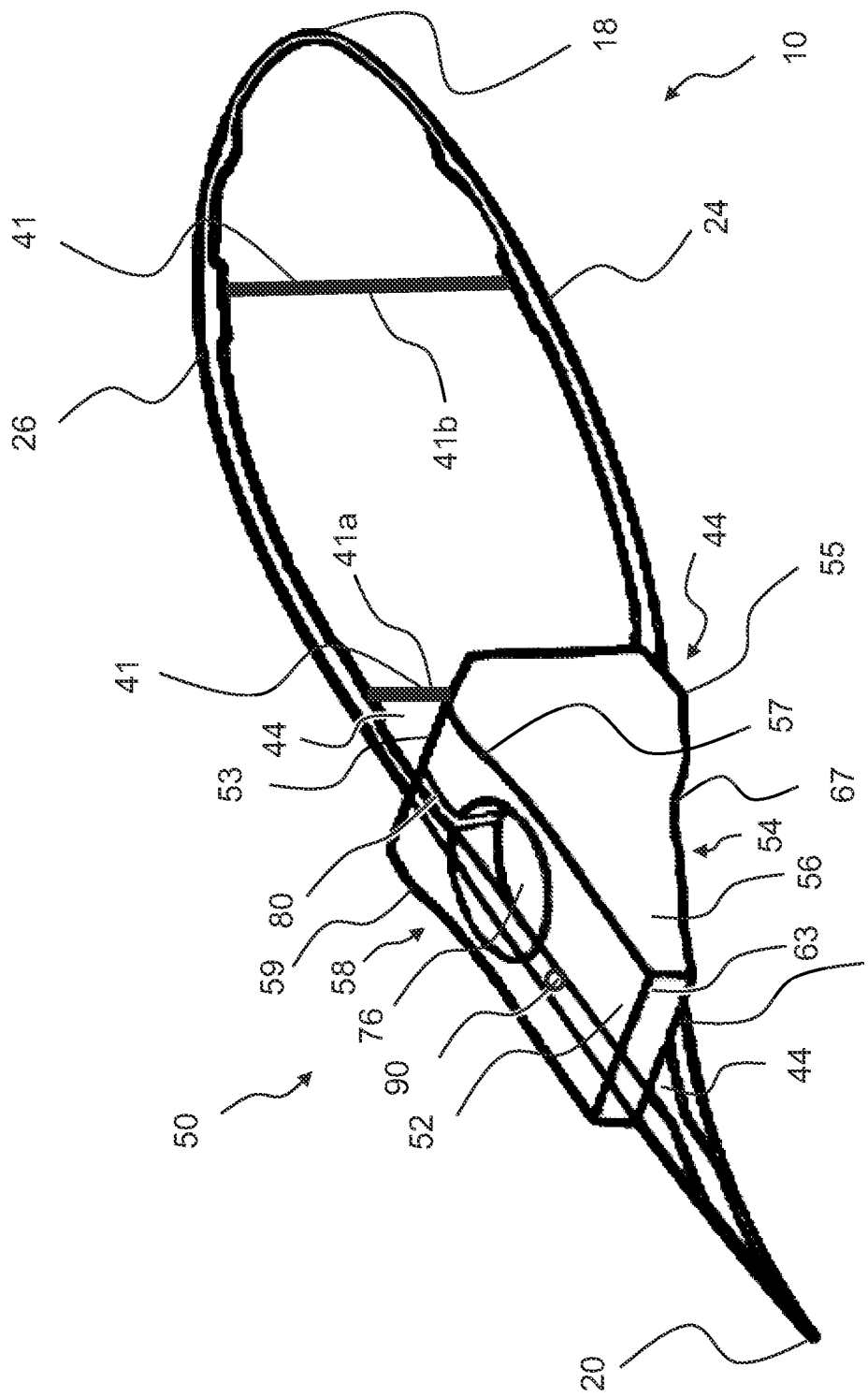
FIG. 4 is a schematic diagram illustrating of a cross section of an exemplary wind turbine blade comprising an exemplary support element.

FIG. 4 is a schematic diagram illustrating a cross section of the airfoil region of an exemplary wind turbine blade 10, such as the wind turbine blade of FIG. 2 or 3. The wind turbine blade comprises an exemplary support element 50. The wind turbine blade comprises a trailing edge 20, a leading edge 18, a pressure side 24, a suction side 26, shear webs 41. The support element 50 is fitted in the wind turbine blade 10 in the region of the trailing edge 20, e.g. between the trailing edge shear web 41a and the trailing edge 20. The support element 50 is attached to a shear web 41, such as the trailing edge shear web 41a. In another exemplary wind turbine blade, additionally or alternatively, a support element may be attached to the leading edge shear web 41b, e.g. to be located between the leading edge shear web 41b and the leading edge 18. The support element 50 may be attached by for instance gluing the support element 50 to the shear web 41 and/or the pressure side 24 and/or the suction side 26.

The support element 50 comprises a first surface 52 facing the suction side 26. The first surface 52 has a leading first edge 53 towards the leading edge 18 of the wind turbine blade 10 and a trailing first edge 63 towards the trailing edge 20 of the wind turbine blade 10. The first surface 52 further comprises a root first edge 57 towards the root region of the wind turbine blade 10 and a tip first edge 59 towards the tip of the blade. The support element 50 has a second surface 54 opposite the first surface 52 and facing the pressure side 24 of the wind turbine blade 10. In an alternative example, the support element 50 could have been turned upside down, such that the first surface 52 would face the pressure side 24, and the second surface 54 would face the suction side 26 of the blade. The second surface 54 comprises a leading second edge 55 towards the leading edge 18 of the wind turbine blade 10 and a trailing second edge 64 towards the trailing edge of the blade. The support element 50 further comprises a root side surface 56 facing the root region of the blade, and a tip side surface 58 opposite the root side surface 56 and facing the tip of the wind turbine blade 10. The root side surface 56 extends between the root first edge 57 and a root second edge 67.

Figure 5:
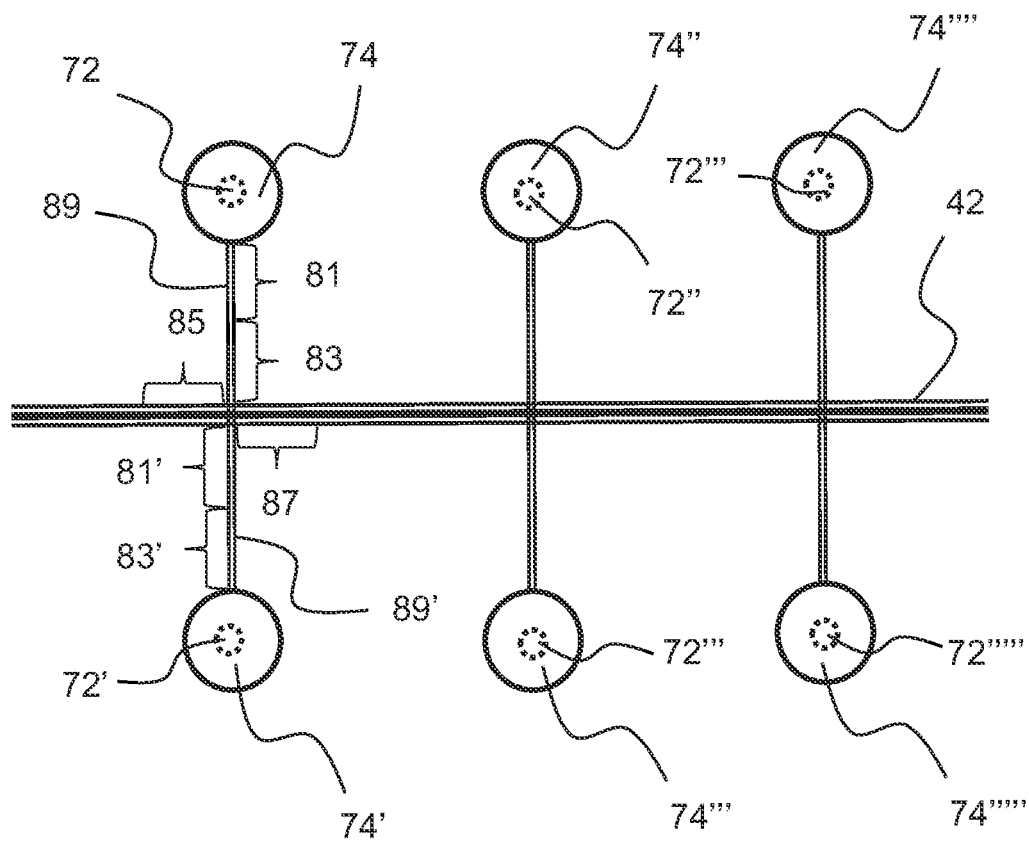
FIG. 5 is a schematic diagram illustrating an exemplary part of a lightning protection system.

The support element 50 further comprises a first receptor base recess 76 configured to receive a first receptor base 74 for coupling with a first receptor 72 of the lightning protection system of the blade (see e.g. FIG. 5). The first receptor base recess 76 is in communication with a first primary receptor cable slot 80, which may receive a primary part 81 of a first receptor cable 89 for coupling with the first receptor base 74 (see e.g. FIG. 5). The support element 50 further comprises a first orientation pocket 90, which may comprise a magnet and/or a magnetic element. The second surface 54 (see e.g. FIG. 10) of the support element 50 may also comprise a second receptor base recess 76' for receiving a second receptor base 74' for coupling with a second receptor 72'. The second surface 54 may also comprise a second primary cable slot 80' in communication with the second receptor base recesses 76'. The second surface 54 may also comprise a second orientation pocket 90'.

In FIG. 4 the support element 50 is positioned in the wind turbine blade 10, such that the first surface 52 is in contact with the suction side 26 of the wind turbine blade 10 and the second surface 54 is in contact with the pressure side 24 of the wind turbine blade. At the trailing first edge 63, the trailing second edge 64, the leading first edge 53 and the leading second edge 55, the surface of the support element is inclined, such as not following the contour of the suction side 26 and the pressure side 24, such as to form drain cavities 44. The drain cavities 44 are configured to allow any water accumulated internally in the wind turbine blade 10 to flow in the longitudinal direction of the wind turbine blade 10 in order to drain through drain holes.

FIG. 5 is a schematic diagram illustrating an exemplary part of a lightning protection system. The lightning protection system comprises a part comprising at least a first receptor base 74. The first receptor 74 base is configured to connect to a first receptor 72, which is indicated by the dotted circle in FIG. 5. The receptor base 74 is further connected to a receptor cable 89. The receptor cable 89 has a primary part 81 and a secondary part 83. The receptor base 74 is connected to the primary part 81 of the receptor cable 89. The receptor cable 89 is connected to a down conductor 42. The down conductor has a primary part 85 and a secondary part 87. The primary part 85 of the down conductor 42 may be connected to the receptor cable 89 and extend towards the root of the wind turbine blade. The secondary part 87 of the down conductor 42 may be connected to the receptor cable 89 and extend towards the root of the wind turbine blade. The receptor cable 89 and the down conductor 42 may join at a slot intersection on a support element, such as the support element 50 shown in FIG. 4. The down conductor 42 is configured to lead a potential lightning to ground. As also illustrated, the lightning protection system may comprise further receptor bases, such as a second receptor base 74' being configured to connect to a second receptor 72', a third receptor base 74" being configured to connect to a third receptor 72", a fourth receptor base 74''' being configured to connect to a fourth receptor 72''', a fifth receptor base 74'''' being configured to connect to a fifth receptor 72'''', and/or a sixth receptor base 74''''' being configured to connect to a sixth receptor 72'''''. The second receptor base 74', the third receptor base 74", the fourth receptor base receptor base 74''', the fifth receptor base 74'''', and the sixth receptor base 74' may be connected to the down conductor 42 similarly as described for the first receptor base 74.

Figure 6A:
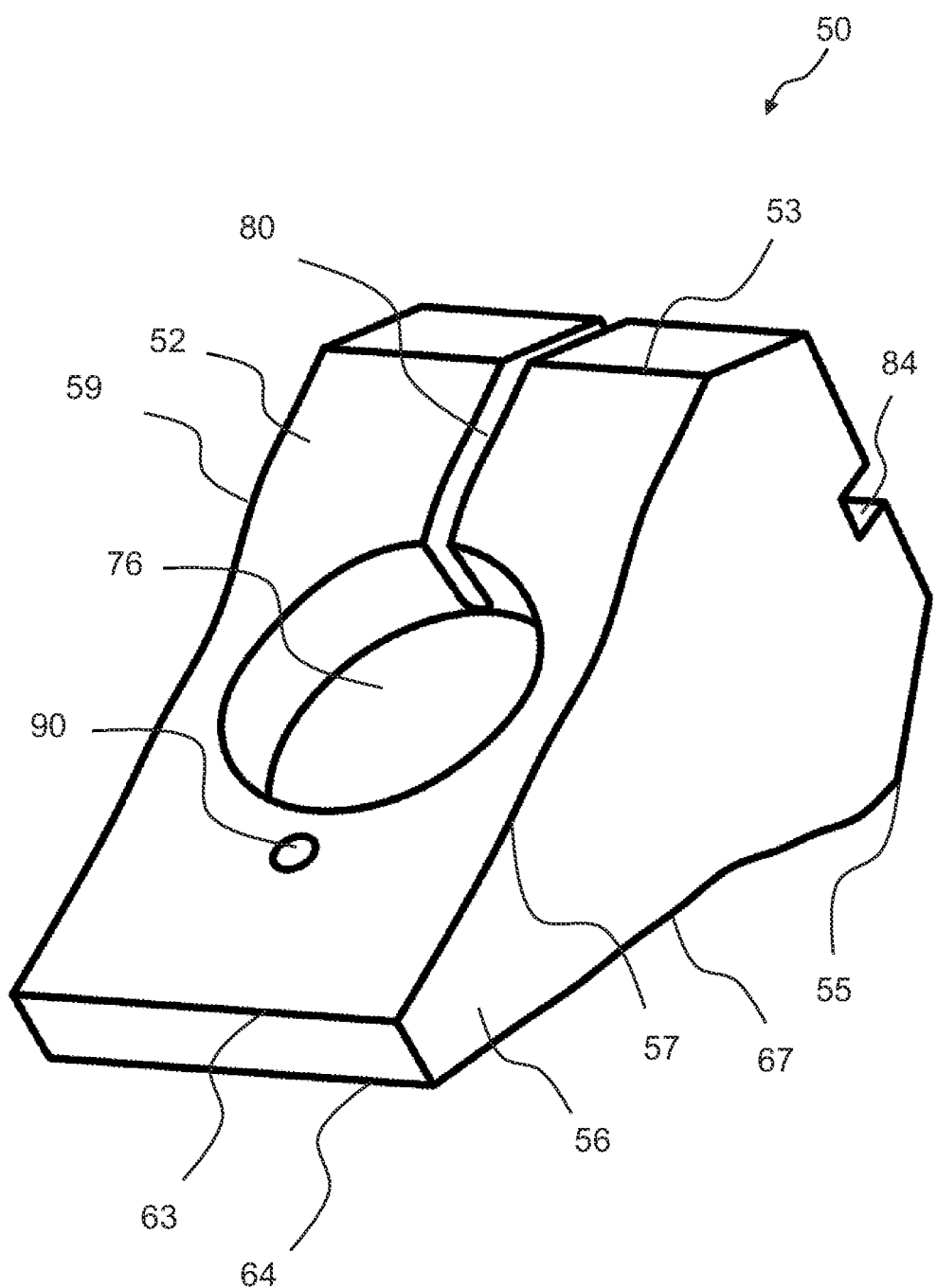
FIG. 6a is a schematic diagram illustrating an exemplary support element.

FIG. 6a is a schematic diagram illustrating an exemplary support element 50, such as the support element 50 as shown in FIG. 4. The support element 50 comprises a first surface 52, e.g. for facing the suction side as illustrated in FIG. 4. The first surface 52 has a leading first edge 53 to be facing towards the leading edge of the blade and a trailing first edge 63 to be facing towards the trailing edge of the blade. The first surface 52 further comprises a tip first edge 59 to be facing towards the tip of the blade and a root first edge 57 to be facing towards the root region of the blade. The trailing first edge 63 and the trailing second edge 64 may be two separate edges, as illustrated, or they may form one coinciding edge. The support element 50 comprises a root side surface 56 to be facing the root region of the blade. The root side surface 56 extends between a root first edge 57 and a root second edge 67.

The support element 50 comprises a first receptor base recess 76 configured to receive a first receptor base for coupling with a first receptor of the lightning protection system of the wind turbine blade. The first receptor base recess 76 is provided in the first surface 52. The first receptor base recess 76 is in communication with a first primary receptor cable slot 80, which may receive part of a first receptor cable, such as a primary part, for coupling with a first receptor base in the first receptor base recess 76. The first primary receptor cable slot 80 is provided in the first surface 52.

The support element 50 comprises a first orientation pocket 90 provided in the first surface 52. The first orientation pocket 90 may comprise a magnet and/or a magnetic element. For example, coupling a receptor to a receptor base located in the support element 50 may involve providing a hole through the shell of the wind turbine blade. Hence in locating the position of the first receptor base, and thereby locating the position for providing a through hole in the shell, a magnetic element provided in the support element 50 at a predetermined distance and orientation relative to the receptor base may facilitating the process of correctly providing the through hole for coupling the receptor to the receptor base.

The support element further comprises a primary down conductor slot 84 and a secondary down conductor slot for receiving a down conductor of the lightning protection system.

Figure 6B:
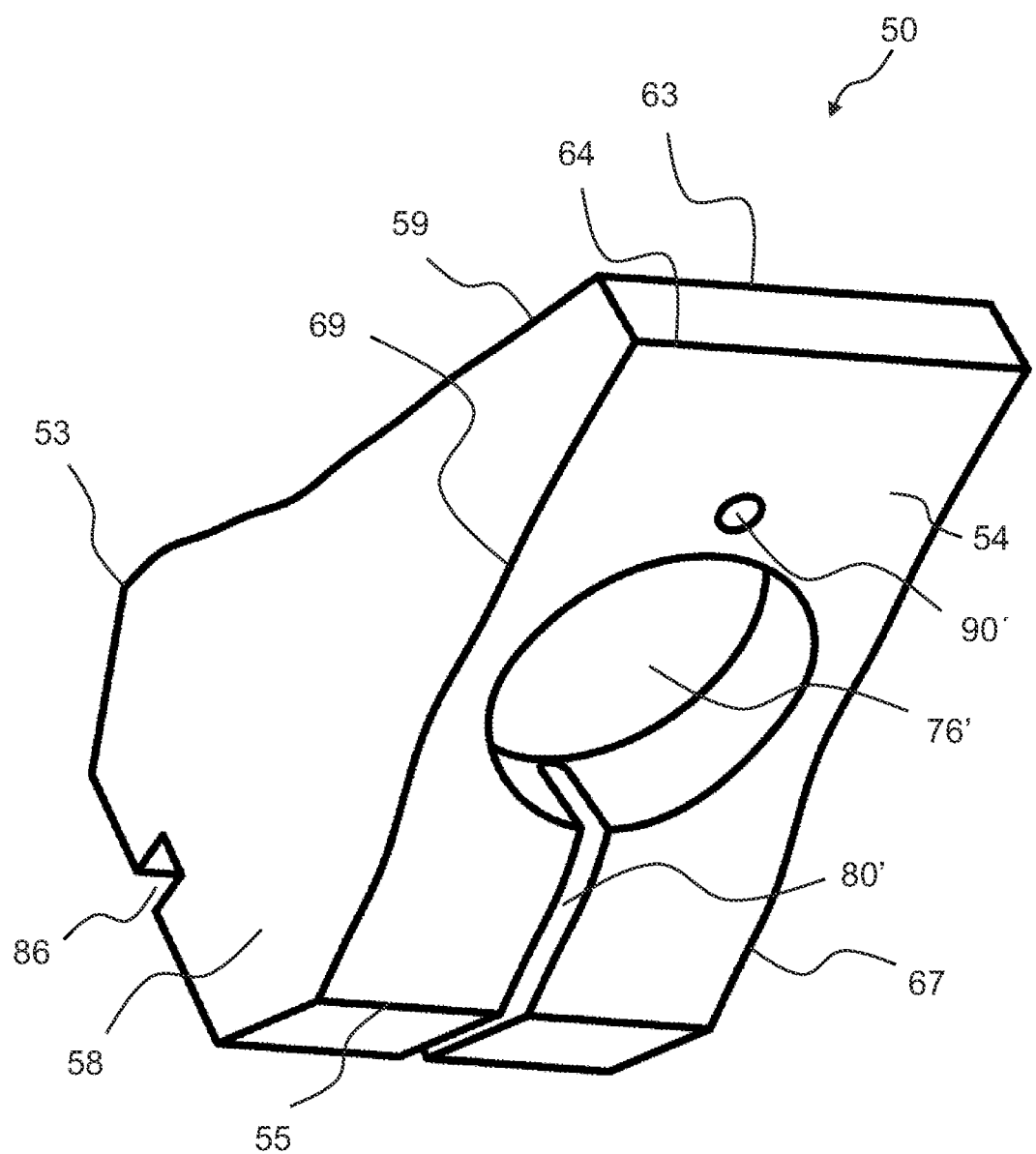
FIG. 6b is a schematic diagram illustrating an exemplary support element.

FIG. 6*b* is a schematic diagram illustrating an exemplary support element 50, such as the support element 50 as shown in the previous figures. The support element 50 comprises a second surface 54, e.g. for facing the pressure side. The second surface 54 has a leading second edge 55 to be facing towards the leading edge of the blade and a trailing second edge 64 to be facing towards the trailing edge of the blade. The second surface 54 further comprises a tip second edge 69 to be facing towards the tip of the blade and a root second edge 67 to be facing towards the root region of the blade. The trailing first edge 63 and the trailing second edge 64 may be two separate edges, as illustrated, or they may form one coinciding edge.

The support element 50 comprises a second receptor base recess 76' configured to receive a second receptor base for coupling with a second receptor of the lightning protection system of the wind turbine blade. The second receptor base recess 76' is provided in the second surface 54. The second receptor base recess 76' is in communication with a second primary receptor cable slot 80', which may receive part of a second receptor cable, such as a primary part, for coupling with a second receptor base in the second receptor base recess 76'. The second primary receptor cable slot 80' is provided in the second surface 54.

The support element 50 comprises a second orientation pocket 90' provided in the second surface 54. The second orientation pocket 90' may comprise a magnet and/or a magnetic element. For example, coupling a receptor to a receptor base located in the support element 50 may involve providing a hole through the shell of the wind turbine blade. Hence in locating the position of the second receptor base, and thereby locating the position for providing a through hole in the shell, a magnetic element provided in the support element 50 at a predetermined distance and orientation relative to the receptor base may facilitating the process of correctly providing the through hole for coupling the receptor to the receptor base.

The support element further comprises a primary down conductor slot and a secondary down conductor 86 slot for receiving a down conductor of the lightning protection system.

The support element 50 comprises a tip side surface 58 opposite the root side surface and to be facing the tip of the blade. The tip side surface 58 extends between a tip first edge 59 and a tip second edge 69.

Figure 7:
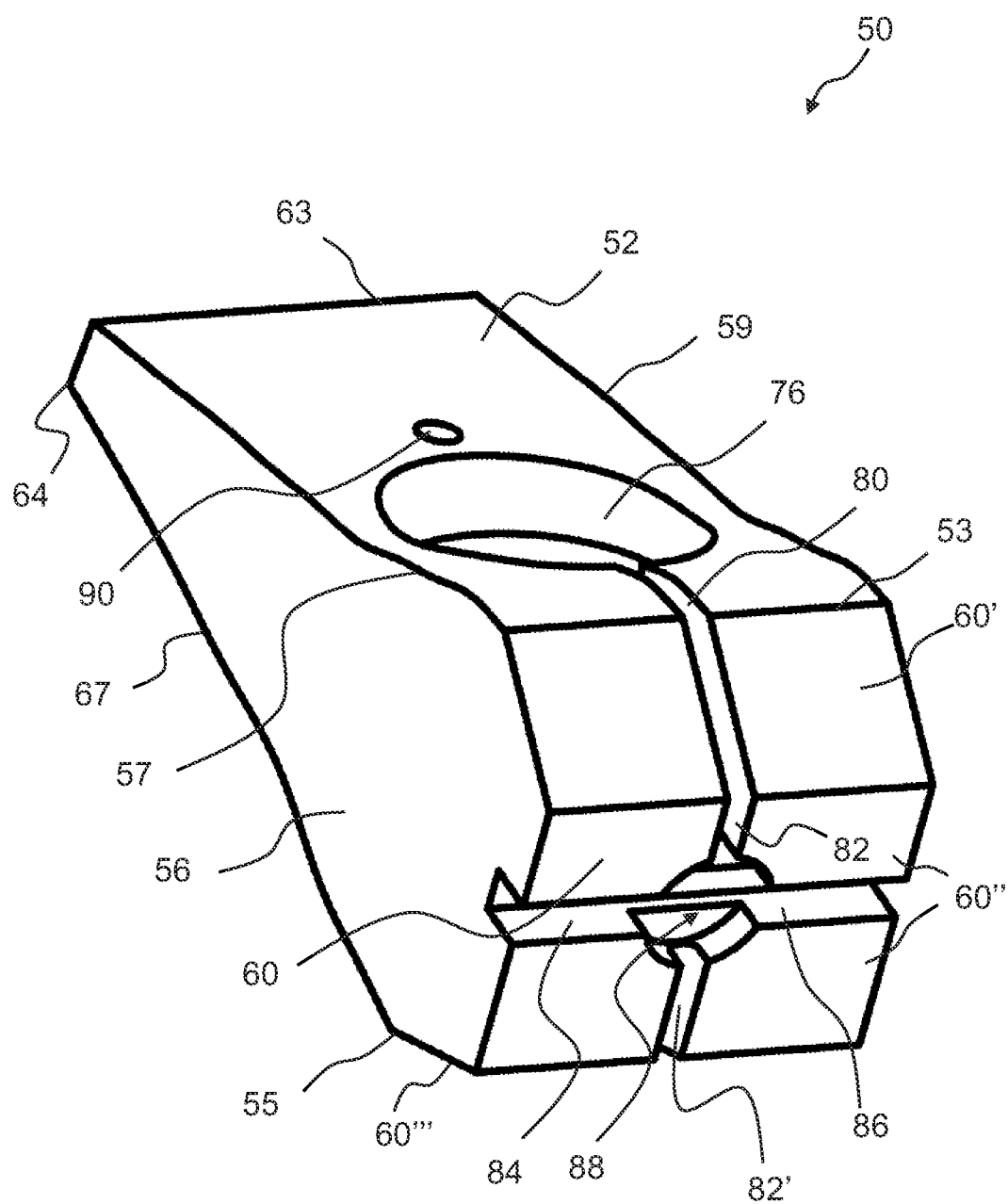
FIG. 7 is a schematic diagram illustrating an exemplary support element.

FIG. 7 is a schematic diagram illustrating an exemplary support element 50, such as the support element 50 as shown in the previous figures. The support element 50 comprises a first surface 52 extending between a leading first edge 53 and a trailing first edge 63. The first surface 52 comprises a first orientation pocket 90, a first receptor base recess 76, and a first primary receptor cable slot 80 in communication with the first receptor base recess 76. The support element 50 comprises a root side surface 56 to be facing the root region of the wind turbine blade. The root side surface 56 extends between a root first edge 57 and a root second edge 67.

The support element 50 further comprises a leading edge surface 60, extending between the leading first edge 53 and the leading second edge 55, to be facing the leading edge of the wind turbine blade. The leading edge surface 60 may form a flat surface, a bent surface or a surface with a plurality of surface parts. For example, as illustrated in FIG. 7, the leading edge surface 60 may comprise a first leading edge surface part 60', a main leading edge surface part 60" and a second leading edge surface part 60'''. The leading edge surface parts 60', 60", 60''' may be non-parallel. The leading edge surface 60 comprises a first secondary receptor cable slot 82, in extension of the first primary receptor cable slot 80 for receiving a receptor cable, such as a secondary part of a first receptor cable. The leading edge surface 60 comprises a second secondary receptor cable slot 82', for receiving a receptor cable, such as a secondary part of a second receptor cable. The leading edge surface 60 comprises a primary down conductor slot 84 for receiving a down conductor of the lightning protection system of a blade, such as a primary part of a down conductor. The leading edge surface 60 comprises a secondary down conductor slot 86 for receiving a down conductor of the lightning protection system of a blade, such as a secondary part of a down conductor. The receptor cable slots 82, 82' and the down conductor slots 84, 86 may be joined at a slot intersection 88. The receptor cable(s) and the down conductor may be joined at the slot intersection 88, e.g. by exothermic welding, such as cadwelding.

Figure 8:
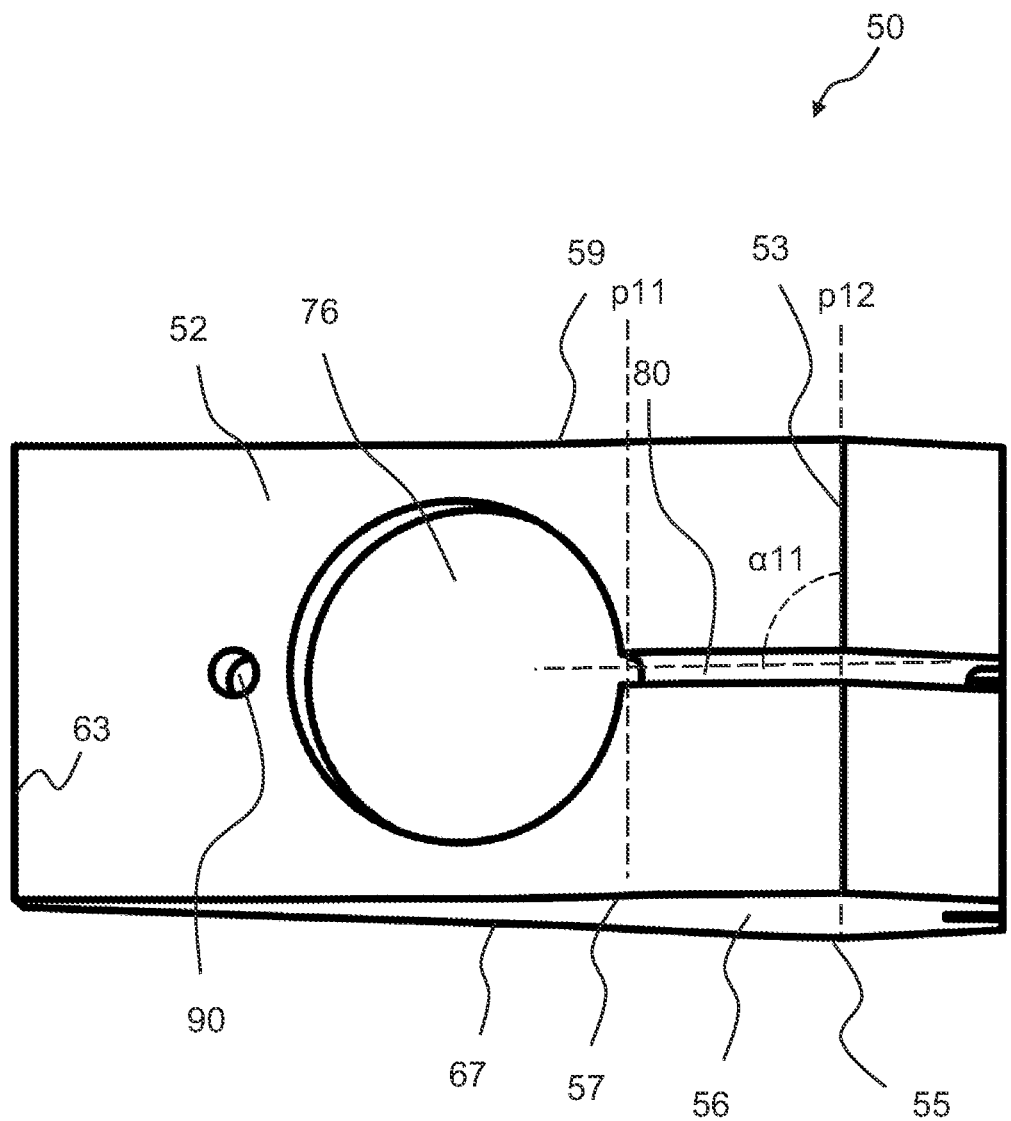
FIG. 8 is a schematic diagram illustrating an exemplary support element.
Figure 17:
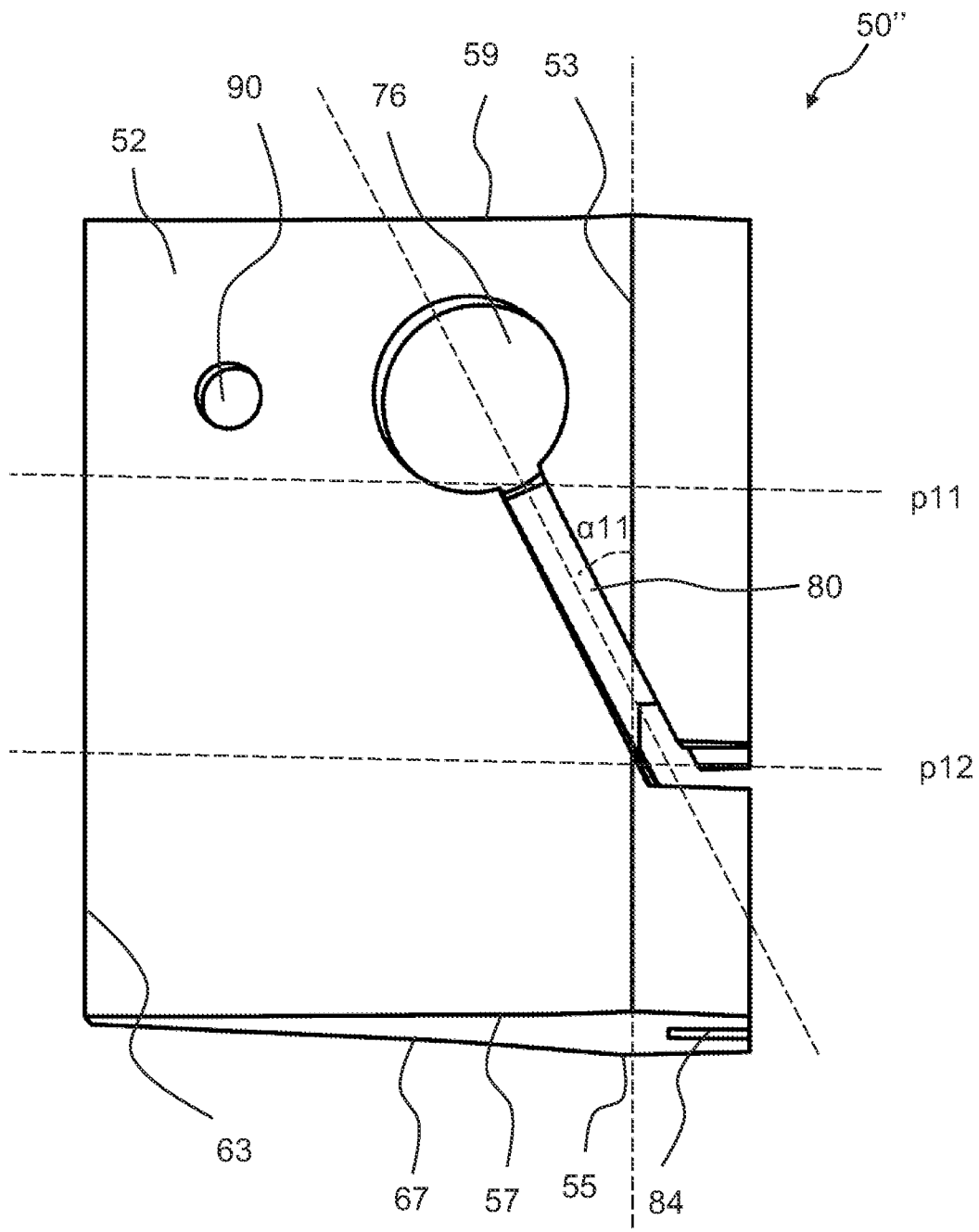
FIG. 17 is a schematic diagram illustrating an exemplary support element.

FIG. 8 is a schematic diagram illustrating an exemplary support element 50, such as the support element 50 as shown in the previous figures. The support element 50 comprises a first surface 52 extending between a leading first edge 53 and a trailing first edge 63. The first surface 52 comprises a first orientation pocket 90 and a first receptor base recess 76. The first receptor base recess 76 is in communication with a first primary receptor cable slot 80. The support element 50 further comprises a root side surface 56 to be facing the root region of the wind turbine blade. The root side surface 56 extends between a root first edge 57 and a root second edge 67. The first primary receptor cable slot 80 extends from a first primary cable point p11 to a second primary cable point p21. The first primary receptor cable slot 80 extends in a direction forming a first primary slot angle α11 with the leading first edge 53. The first primary slot angle α11 may be 90 degrees or between 20-90 degrees, such as 45 degrees. FIG. 17 shows another exemplary support element 50 with a first primary slot angle α11 different from 90 degrees.

Figure 9:
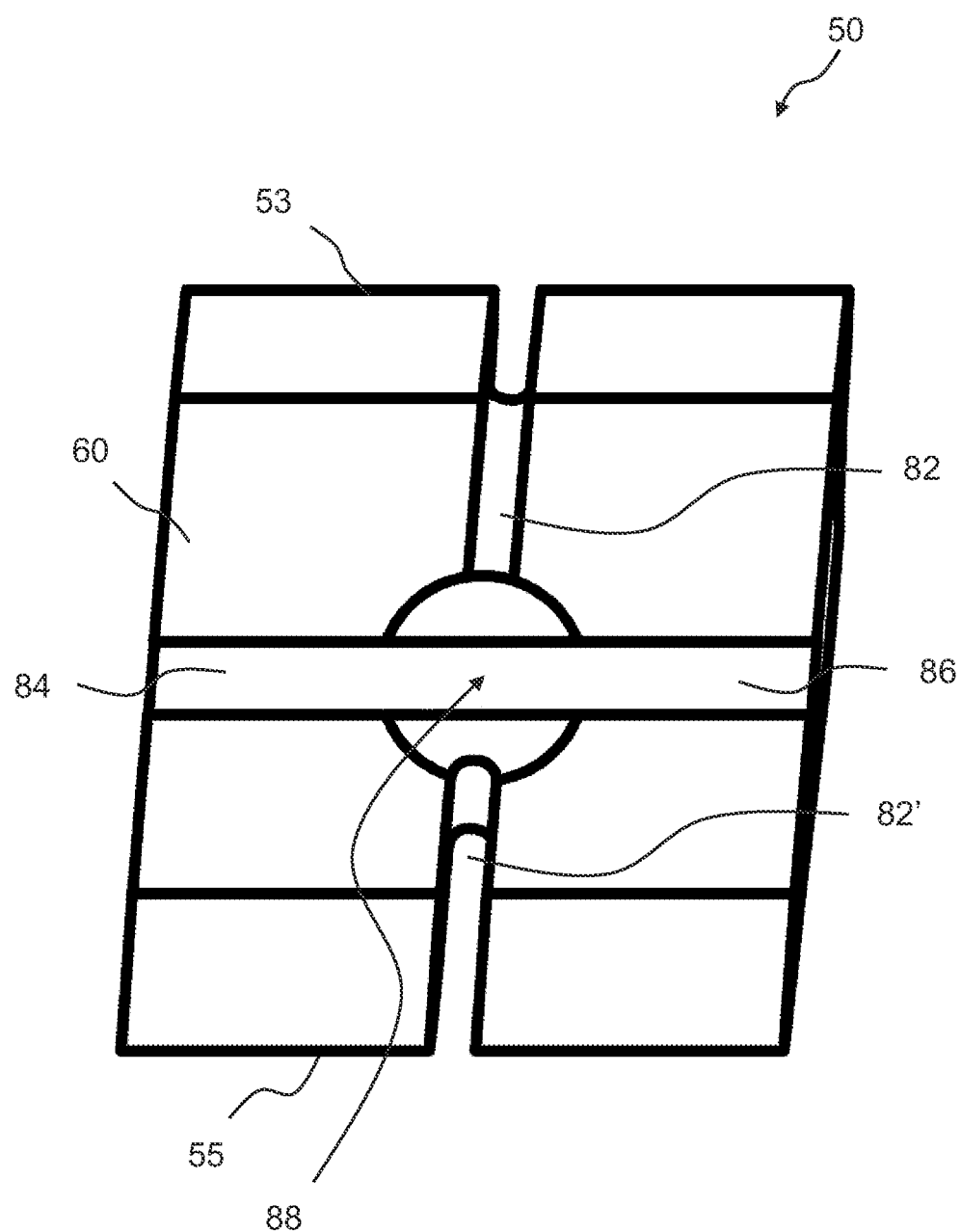
FIG. 9 is a schematic diagram illustrating an exemplary support element.

FIG. 9 is a schematic diagram illustrating an exemplary support element 50, such as the support element 50 as shown in the previous figures. The support element 50 comprises a leading edge surface 60 extending between a leading first edge 53 and a leading second edge 55. The support element 50 comprises a first secondary receptor cable slot 82 in extension from the first primary receptor cable slot, and a second secondary receptor cable slot 82' in extension from the second primary receptor cable slot. The support element 50 comprises a primary down conductor slot 84 and a secondary down conductor slot 86 for receiving a down conductor of a lightning protection system of the wind turbine blade. The first secondary receptor cable slot 82, the second secondary receptor cable slot 82', the primary down conductor slot 84 and the secondary down conductor slot 86 may join at slot intersection 88.

Figure 10:
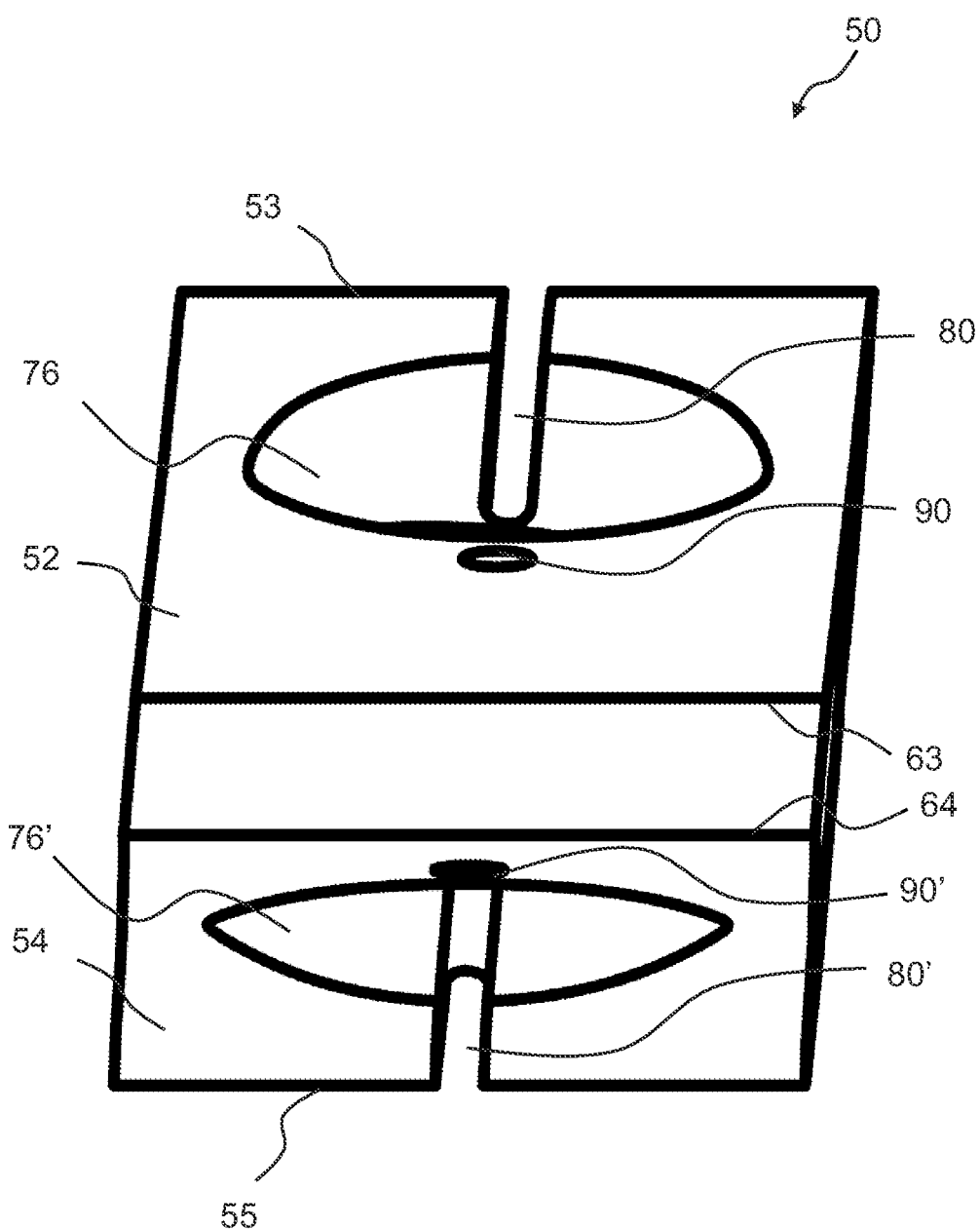
FIG. 10 is a schematic diagram illustrating an exemplary support element.

FIG. 10 is a schematic diagram illustrating an exemplary support element 50, such as the support element 50 as shown in the previous figures. The support element 50 comprises a first surface 52 to be facing the suction side. The first surface 52 could alternatively be configured to face the pressure side. The first surface 52 has a leading first edge 53 to be facing towards the leading edge of the blade, and a trailing first edge 63 to be facing towards the trailing edge of the blade. The support element 50 comprises a first receptor base recess 76 configured to receive a first receptor base for coupling with a first receptor of the lightning protection system of the wind turbine blade. The first receptor base recess 76 is in communication with a first primary receptor cable slot 80, which may receive part of a first receptor cable for coupling with the first receptor base positioned in the first receptor base recess 76. The support element 50 further comprises a first orientation pocket 90, which may comprise a magnet and/or a magnetic element.

The support element 50 has a second surface 54 opposite the first surface 52 to be facing the pressure side of the wind turbine blade. The second surface 54 could alternatively be configured to face the suction side. The second surface 54 comprises a leading second edge 55 to be facing towards the leading edge of the wind turbine blade and a trailing second edge 64 to be facing towards the trailing edge of the wind turbine blade. The trailing first edge 63 and the trailing second edge 64 may be two separate edges, such as in FIG. 10, or they may form one coinciding edge. The second surface 54 of the support element 50 comprises a second receptor base recess 76' for receiving a second receptor base for coupling with a second receptor. The second surface 54 comprises a second primary cable slot 80' in communication with the second receptor base recesses 76' and a second orientation pocket 90'.

Figure 11A:
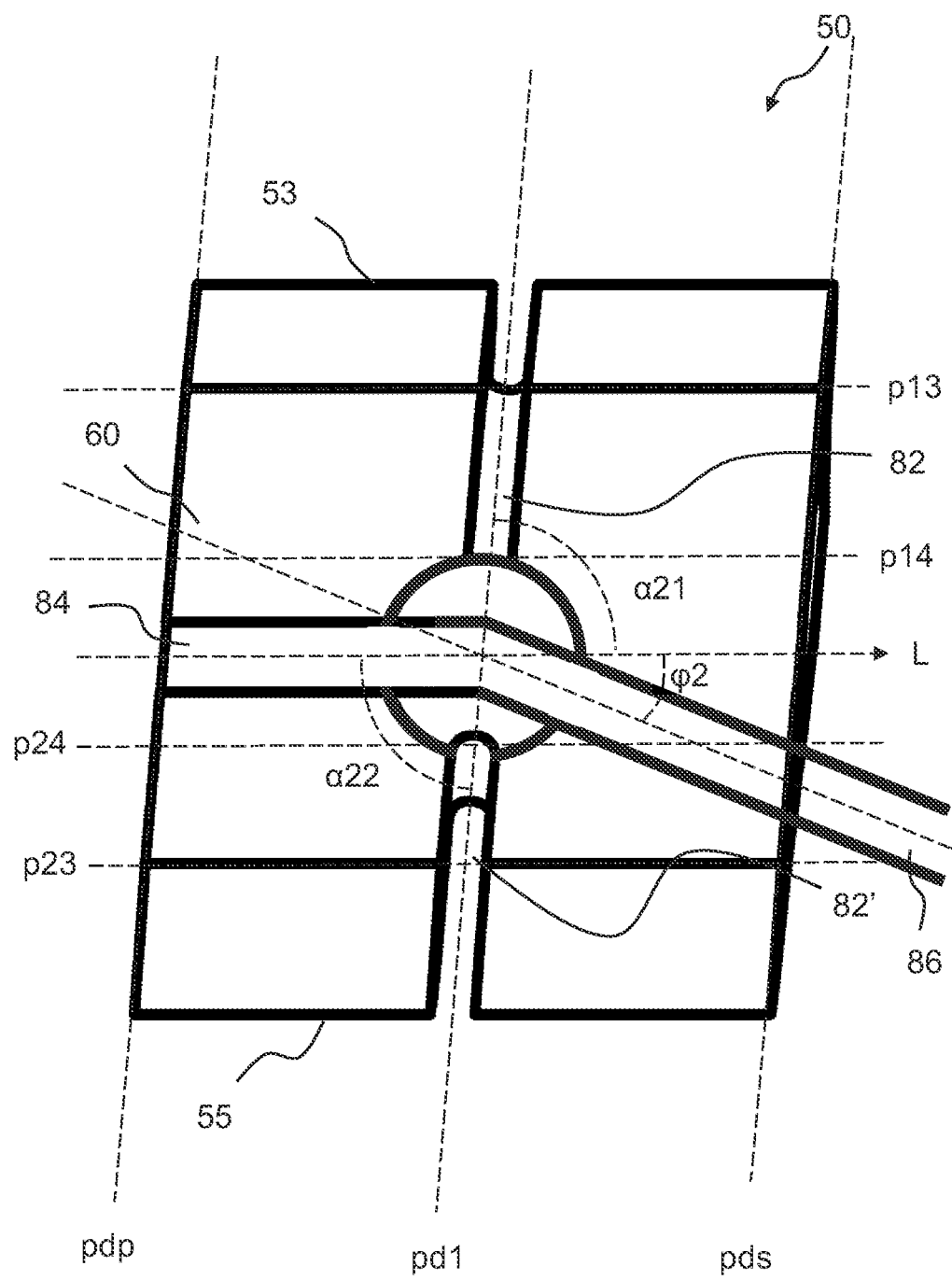
FIG. 11a is a schematic diagram illustrating an exemplary support element.

FIG. 11a is a schematic diagram illustrating an exemplary support element 50, such as the support element 50 as shown in the previous figures. The support element 50 has, on the leading edge surface 60, a first secondary receptor cable slot 82 extending from a first tertiary cable point p13 to a first quaternary cable point p14. The first secondary receptor cable slot 82 extends in a direction forming a second primary slot angle α21 with a longitudinal axis L, such as the longitudinal axis of the wind turbine blade. For example, the primary slot angle α21 may be perpendicular to the longitudinal axis L. The support element 50 comprises a second secondary receptor cable slot 82' extending from a second tertiary cable point p23 to a second quaternary cable point p24. The second secondary receptor cable slot 82' extends in a direction forming a second secondary slot angle α22 with the longitudinal axis L. For example, the second secondary slot angle α22 may be perpendicular to the longitudinal axis L. Alternatively, the second primary slot angle α21 and/or the second secondary slot angle α22 may be between 20-90 degrees, such as 45 degrees. In the present example, the second primary slot angle α21 and the second secondary slot angle α22 are the same, but in other exemplary support elements the second primary slot angle α21 and the second secondary slot angle α22 may be different, such as in FIG. 11b.

The support element 50 comprises a primary down conductor slot 84 extending along the longitudinal axis L from a first down conductor point pd1 to a primary down conductor point pdp on the leading edge surface 60. The primary down conductor slot 84 could alternatively extend in a direction from the first down conductor point pd1 to the primary down conductor point pdp forming a primary down conductor angle φ1, e.g. between 10 and 30 degrees, such as 20 degrees.

The support element 50 comprises a secondary down conductor slot 86 extending from the first down conductor point pd1 to a secondary down conductor point pdp. The secondary down conductor slot 86 forms a secondary down conductor angle φ2 with the longitudinal axis L in a plane of the leading edge surface 60. The secondary down conductor angle φ2 is between 10 and 45 degrees, such as 20 degrees. Alternatively, the secondary down conductor slot 86 could extend from the first down conductor point pd1 to the secondary down conductor point pds along the longitudinal axis L of the wind turbine blade. Hence, the secondary down conductor angle φ2 may be 0 degrees. The bend radius of the first down conductor slot and/or the second down conductor slot is provided according to the specification of the down conductor, such as the stiffness of the down conductor. The bend radius may be minimum 300 mm, such as 330 mm.

Figure 11B:
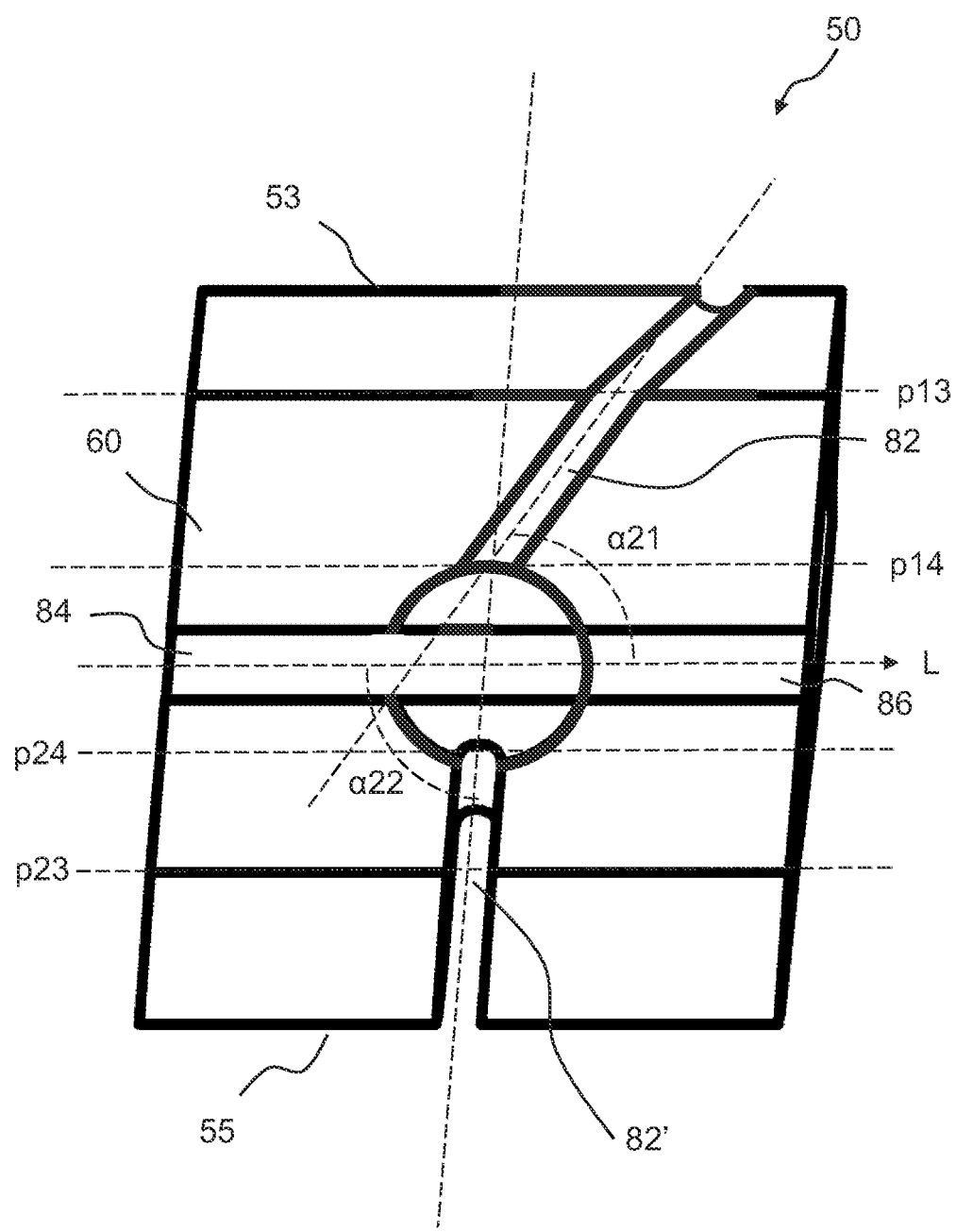
FIG. 11b is a schematic diagram illustrating an exemplary support element.

FIG. 11b is a schematic diagram illustrating an exemplary support element 50, such as the support element 50 as shown in one or more of the previous figures. The support element 50 has on the leading edge surface 60 a first secondary receptor cable slot 82 extending from a first tertiary cable point p13 to a first quaternary cable point p14. The first secondary receptor cable slot 82 extends in a direction forming a second primary slot angle α21 with the longitudinal axis L. The support element comprises a second secondary receptor cable slot 82' extending from a second tertiary cable point p23 to a second quaternary cable point p24 in a direction forming a second secondary slot angle α22.

Figure 12:
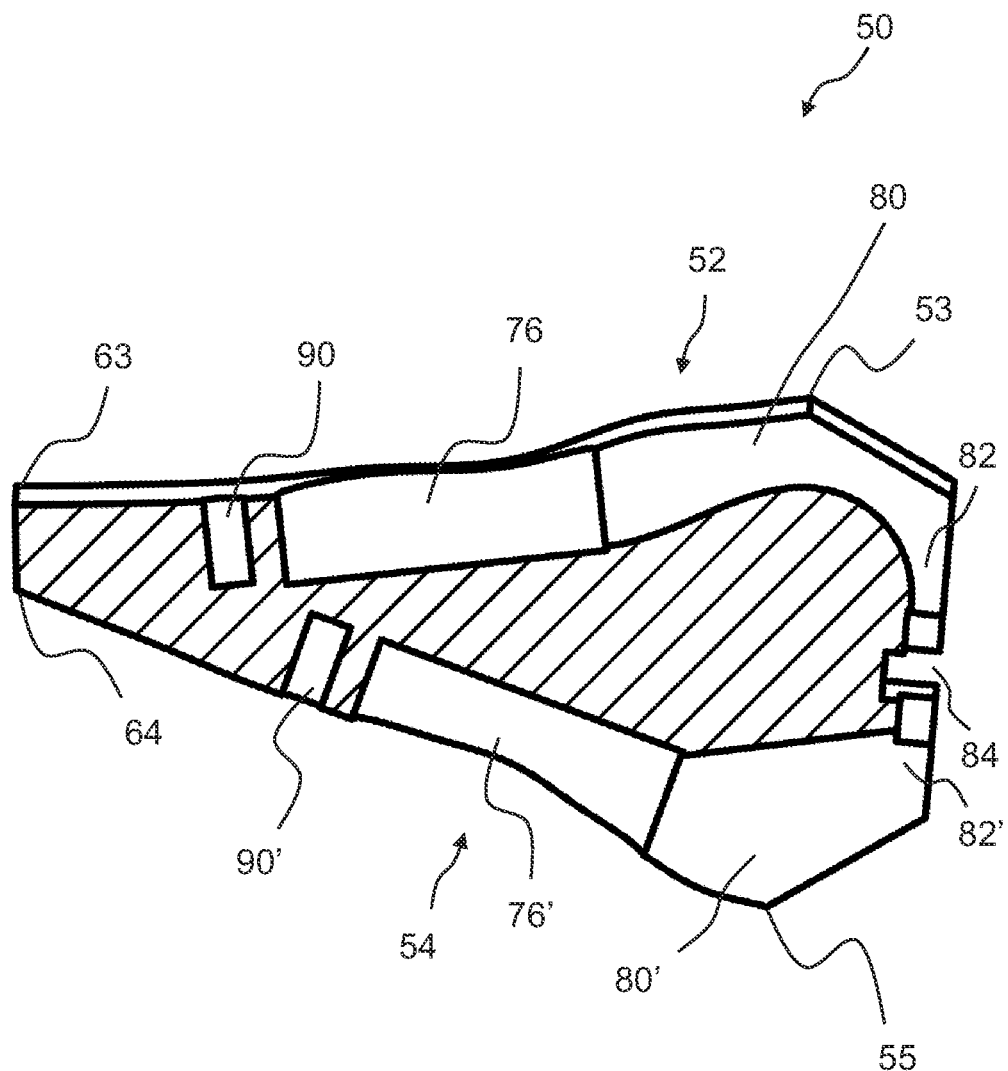
FIG. 12 is a schematic diagram illustrating a cross sectional view of an exemplary support element.

FIG. 12 is a schematic diagram illustrating a cross sectional view of an exemplary support element 50, such as the support element 50 as shown in the previous figures. The support element 50 comprises a first surface 52 to be facing the suction side of the wind turbine blade. The first surface 52 could alternatively be configured to face the pressure side. The first surface 52 has a leading first edge 53 towards the leading edge of the blade and a trailing first edge 63 towards the trailing edge of the blade. The support element 50 comprises a first receptor base recess 76 configured to receive a first receptor base for coupling with a first receptor of the lightning protection system of the wind turbine blade. The first receptor base recess 76 is in communication with a first primary receptor cable slot 80, which may receive part of a first receptor cable for coupling with the first receptor base in the first receptor base recess 76. The support element further comprises a first orientation pocket 90, which may comprise a magnet and/or a magnetic element.

The support element 50 has a second surface 54 opposite the first surface 52 to be facing the pressure side of the blade. The second surface 54 could alternatively be configured to face the suction side. The second surface 54 comprises a leading second edge 55 to be facing towards the leading edge of the blade and a trailing second edge 64 to be facing towards the trailing edge of the blade. The trailing first edge 63 and the trailing second edge 64 may be two separate edges, as illustrated, or they may form one coinciding edge. The second surface 54 of the support element 50 comprises a second receptor base recess 76' for receiving a second receptor base for coupling with a second receptor. The second surface 54 comprises a second primary cable slot 80' in communication with the second receptor base recesses 76' and a second orientation pocket 90'.

The slots 80, 82, 80', 82' is provided to facilitate a bend of the respective receptor cable, in accordance with the specification of the receptor cable. The radius of the bend may correspond to the stiffness of the first receptor cable. The radius of the bend may for instance be minimum 50 mm.

Figure 13:
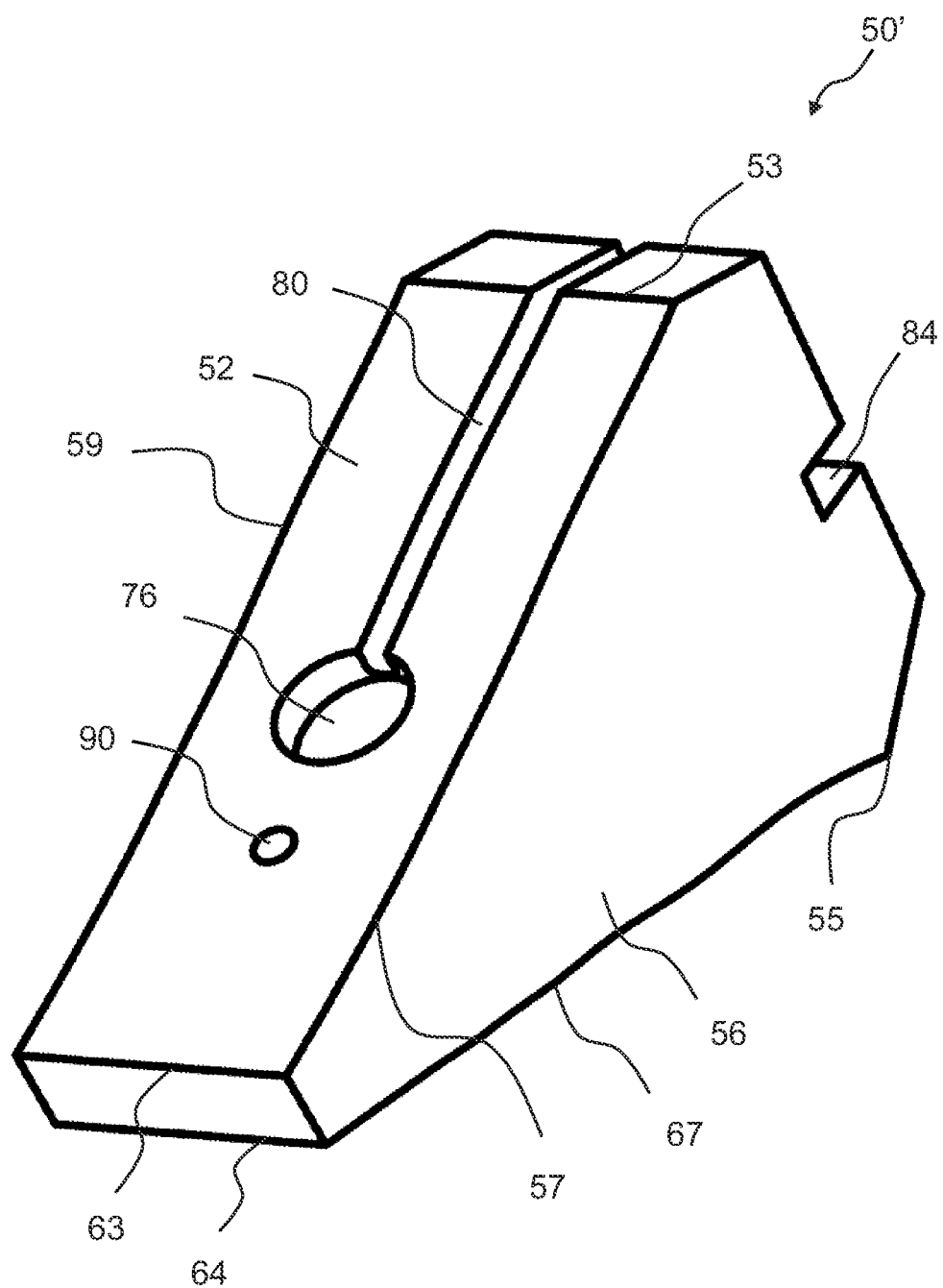
FIG. 13 is a schematic diagram illustrating an exemplary support element.
Figure 14:
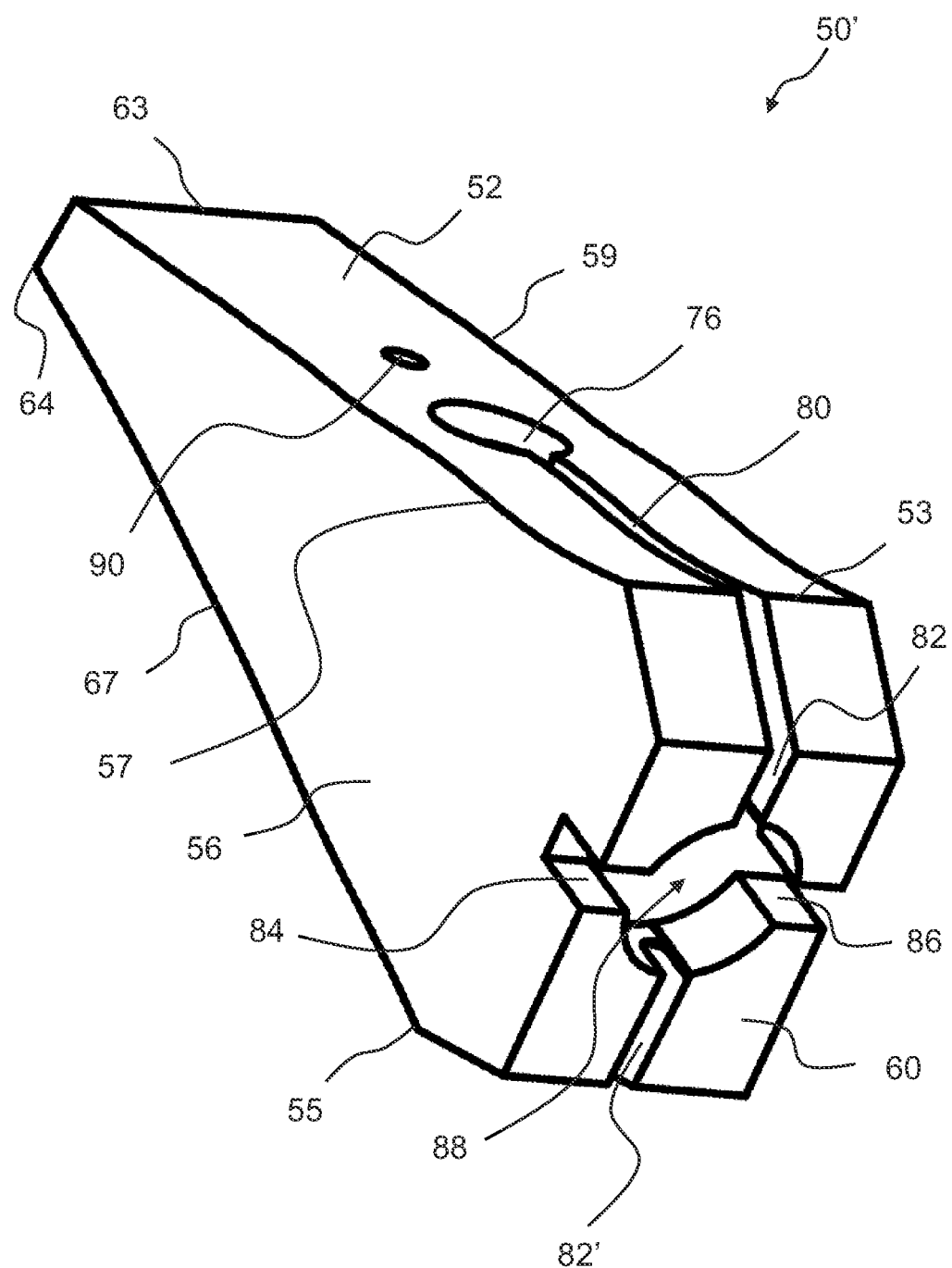
FIG. 14 is a schematic diagram illustrating an exemplary support element.

FIGS. 13 and 14 are schematic diagrams illustrating an exemplary support element 50'. The support element 50' comprises the same features as described in relation to the exemplary support element 50 of the previous figures, however having different dimensions.

Figure 15:
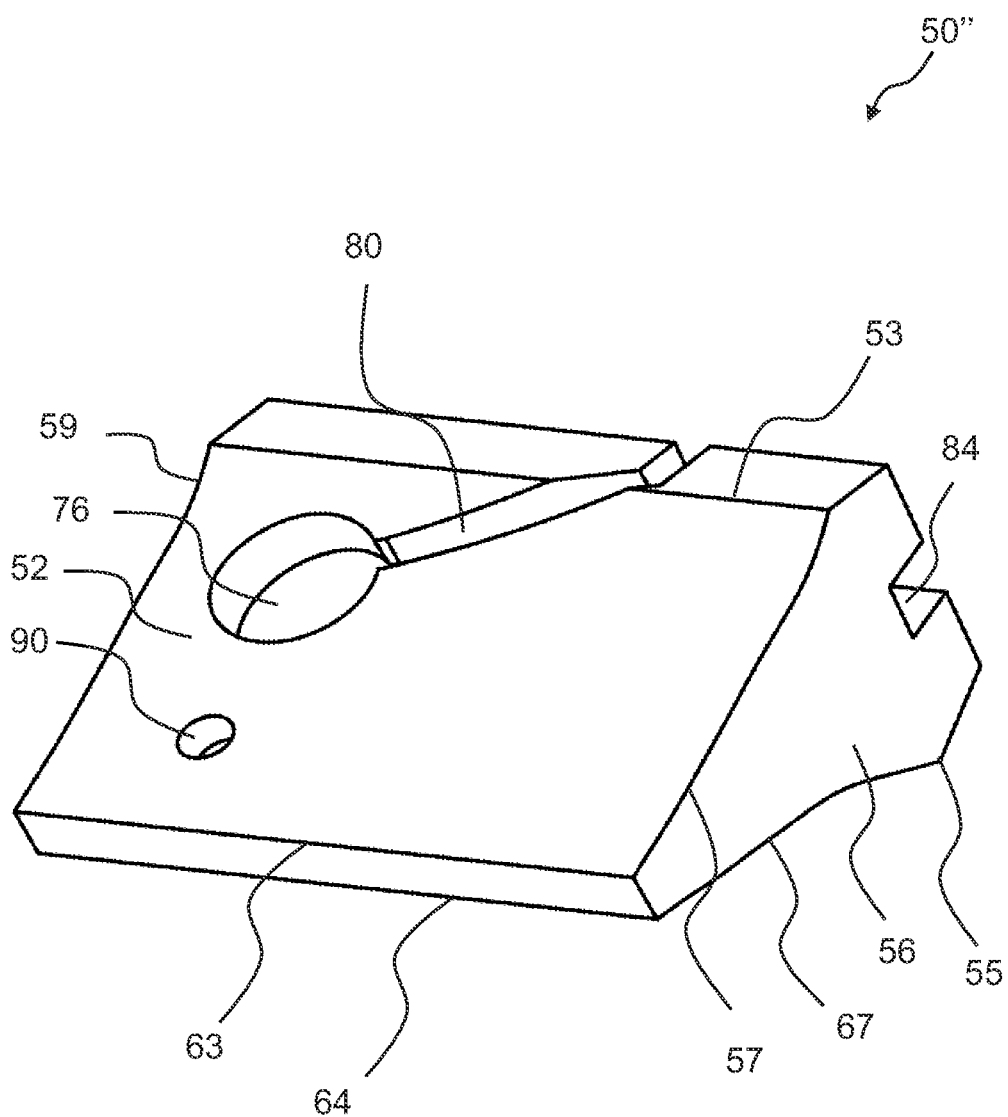
FIG. 15 is a schematic diagram illustrating an exemplary support element.
Figure 16:
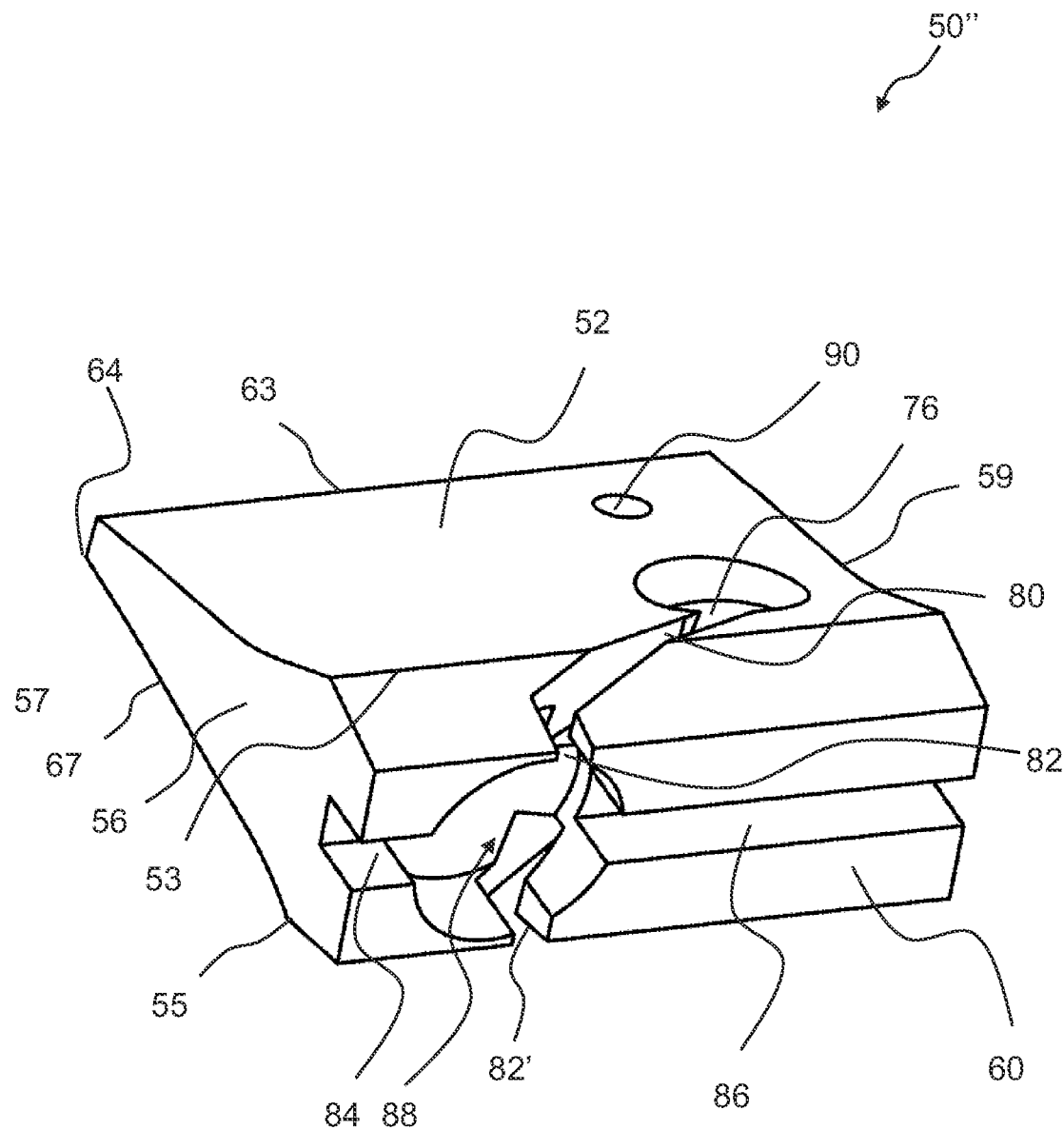
FIG. 16 is a schematic diagram illustrating an exemplary support element.

FIGS. 15-17 are schematic diagrams illustrating an exemplary support element 50". The support element 50" comprises the same features as described in relation to the exemplary support element 50 of the previous figures. However, the exemplary support element 50" have different dimensions and differently angled slots.

The first primary receptor cable slot 80 extends from a first primary cable point p11 to a first secondary cable point p12. The first primary receptor cable slot 80 extends in a direction forming a first primary slot angle α11 with the leading first edge 53. The first primary slot angle α11 may be between 20-90 degrees, such as 45 degrees. Alternatively, the primary first receptor cable slot 80 may extend from a first primary cable point p11 to a first secondary cable point p12 in a direction perpendicular to the leading first edge 53, such as in FIG. 8.

Figure 18:
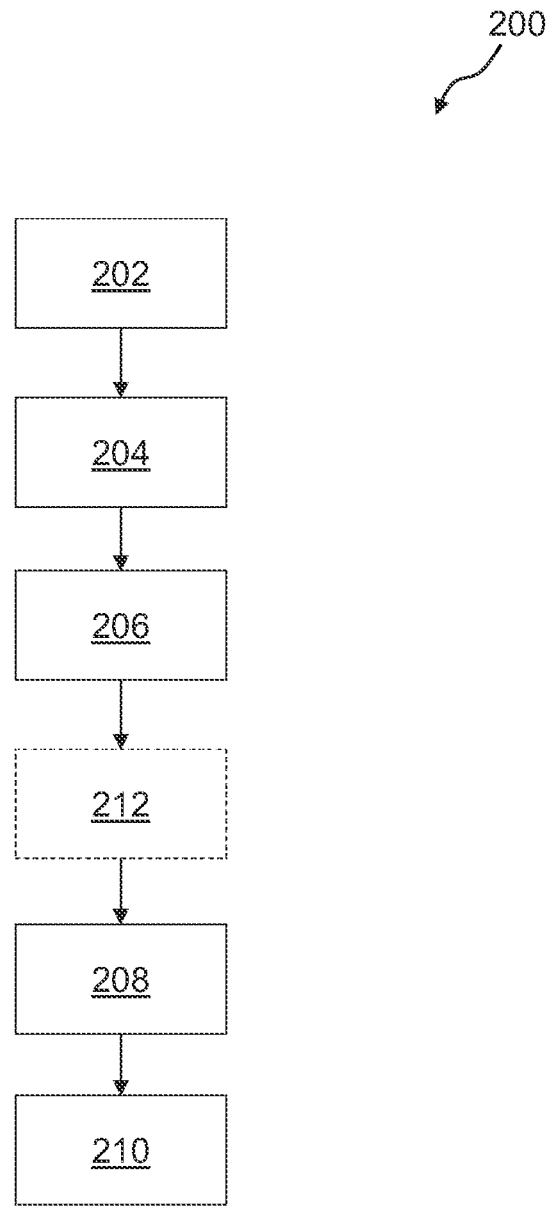
FIG. 18 is a flow diagram illustrating an exemplary method for supporting elements of a lightning protection system.

FIG. 18 is a flow diagram illustrating an exemplary method 200 for supporting elements of a lightning protection system.

The method comprises providing 202 a support element, such as the support element in the previous figures. The support element comprises a first surface, a second surface opposite the first surface, and a tip side surface, wherein the first surface comprises a first receptor base recess.

The method 200 comprises inserting 204 a first receptor base in the first receptor base recess of the support element. The receptor base may be fastened, by for instance gluing or soldering the receptor base to the receptor base recess.

The method 200 further comprises positioning 206 the support element in an internal cavity of the wind turbine blade between the pressure side and the suction side. The support element may be glued to a shear web or spar side, for instance a trailing edge shear web or a trailing edge spar side. The support element may also or alternatively be glued to the pressure side or suction side or both.

The method 200 comprises providing 208 a hole through the pressure side and/or the suction side to access the first receptor base located in the support element. The hole(s) may for instance be drilled through the shell(s) of the blade. Providing 208 the hole through the pressure side may comprise providing a hole in the first receptor base located in the support element, e.g. the hole may be drilled through the shell and through the receptor base. Providing 208 the hole may comprise providing the hole, e.g. of the shell and/or the first receptor base, with internal threads, such as to allow fastening of a receptor with external threads in the hole(s).

The method 200 comprises connecting 210 the first receptor to the receptor base through the hole. The hole may comprise internal threads, such that a receptor with external threads may engage with the hole in a threaded configuration.

Optionally, the method 200 comprises locating 212 the position of the first receptor base in the support element before providing 208 the hole through the pressure side and/or the suction side. Locating 212 the position of the first receptor base may comprise locating a magnetic element in an orientation pocket of the support element through the pressure side and/or the suction side. The orientation pocket may be located at a predetermined distance and orientation from the receptor base recess, such that locating the orientation pocket by tracing the magnetic element provides information about where the receptor base recess is located.

The term "receptor" is to be understood as an electrically conductive object being configured with a view for capturing and conducting a lightning current.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
36 tip
38 chord line
41 shear web
41a trailing edge shear web
41b leading edge shear web
42 down conductor
44 drain cavity
50 support element
52 first surface
53 leading first edge
54 second surface
55 leading second edge
56 root side surface
57 root first edge
58 tip side surface
59 tip first edge 60 leading edge surface
62 trailing edge surface
63 trailing first edge
64 trailing second edge
67 root second edge
69 tip second edge
72 first receptor
72' second receptor
72" third receptor
72'" fourth receptor
72"" fifth receptor
72""' sixth receptor
74 first receptor base
74' second receptor base
74" third receptor base
74'" fourth receptor base
74"" fifth receptor base
74""' sixth receptor base
76 first receptor base recess
76' second receptor base recess
80 first primary receptor cable slot
81 primary part of a first receptor cable
82 first secondary receptor cable slot
83 secondary part of a first receptor cable
80' second primary receptor cable slot
81' primary part of a second receptor cable
82' second secondary receptor cable slot
83' secondary part of a second receptor cable
84 primary down conductor slot
85 primary part of a down conductor cable
86 secondary down conductor slot
87 secondary part of a down conductor cable
88 slot intersection
89 receptor cable
90 first orientation pocket
90' second orientation pocket
L longitudinal axis
p11 first primary cable point
p12 first secondary cable point
p13 first tertiary cable point
p14 first quaternary cable point
p21 second primary cable point
p22 second secondary cable point
p23 second tertiary cable point
p24 second quaternary cable point
α11 first primary slot angle
α12 first secondary slot angle
α21 second primary slot angle
α22 second secondary slot angle
pd1 first down conductor point
pdp primary down conductor point
pds secondary down conductor point
φ1 primary down conductor angle
φ2 secondary down conductor angle

The invention claimed is:

1. A support element for a lightning protection system of a wind turbine blade extending from a root to a tip, the wind turbine blade comprising a root region, an airfoil region with the tip, a pressure side, a suction side and a chord line extending between a leading edge and a trailing edge, the support element being configured to support one or more elements of the lightning protection system, the support element comprising:

a first surface configured to face towards the suction side or the pressure side of the wind turbine blade, the first surface having a leading first edge and a trailing first edge opposite the leading first edge, the first surface having a tip first edge and a root first edge opposite the tip first edge;

a second surface opposite the first surface, the second surface having a leading second edge and a trailing second edge opposite the leading second edge, the second surface having a tip second edge and a root second edge opposite the tip second edge;

a root side surface configured to face towards the root of the wind turbine blade and extending between the root first edge and the root second edge; and a tip side surface configured to face towards the tip of the wind turbine blade and extending between the tip first edge and the tip second edge, wherein the first surface comprises a first receptor base recess configured to receive a first receptor base for coupling with a first receptor of the lightning protection system, wherein the first surface comprises a first primary receptor cable slot configured to receive at least a primary part of a first receptor cable for coupling the first receptor base with a down conductor cable, and wherein the support element has a tapered profile such that a thickness of the support element between the first surface and the second surface decreases in a chordal direction from the leading first and second edges to the trailing first and second edges.

2. The support element according to claim 1, wherein the second surface comprises one or more second receptor base recesses including a second receptor base recess configured to receive a second receptor base for coupling with a second receptor of the lightning protection system.

3. The support element according to claim 1, wherein the first primary receptor cable slot extends from a first primary cable point to a first secondary cable point in a direction forming a first primary slot angle with the leading first edge, wherein the first primary slot angle is between 20-90 degrees.

4. The support element according to claim 3, wherein the first primary slot angle is 45 degrees.

5. The support element according to claim 1, comprising a leading edge surface extending between the leading first edge and the leading second edge.

6. The support element according to claim 5, wherein the leading edge surface comprises a primary down conductor slot configured to receive at least a primary part of the down conductor cable, wherein the primary down conductor slot extends along a longitudinal axis L of the wind turbine blade from a first down conductor point to a primary down conductor point on the leading edge surface.

7. The support element according to claim 5, wherein the leading edge surface comprises a secondary down conductor slot configured to receive at least a secondary part of the down conductor cable, wherein the secondary down conductor slot extends along a direction from a first down conductor point to a secondary down conductor point forming a secondary down conductor angle with a longitudinal axis L of the wind turbine blade in a plane of the leading edge surface, wherein the secondary down conductor angle is between 10 and 45 degrees.

8. The support element according to claim 7, wherein the secondary down conductor angle is 20 degrees.

9. The support element according to claim 5, wherein the leading edge surface comprises a first secondary receptor cable slot configured to receive at least a secondary part of the first receptor cable for coupling the first receptor base with the down conductor cable.

10. The support element according to claim 1, wherein the support element is made of a foamed polymer.

11. The support element according to claim 1, wherein the support element comprises a first orientation pocket located a predetermined distance from the first receptor base recess.

12. The support element according to claim 11, wherein the first orientation pocket is configured to receive a first magnetic element and/or wherein the first orientation pocket comprises a first magnetic element.

13. A wind turbine blade extending from a root to a tip, the wind turbine blade comprising a root region, an airfoil region with the tip, a pressure side, a suction side and a chord line extending between a leading edge and a trailing edge, the wind turbine blade comprising the support element according to claim 1, the support element being configured to support one or more elements of the lightning protection system.

14. A method for supporting one or more elements of a lightning protection system in a wind turbine blade extending from a root to a tip, the wind turbine blade comprising a root region, an airfoil region with the tip, a pressure side, a suction side and a chord line extending between a leading edge and a trailing edge, the method comprising:
  providing a support element comprising:
    a first surface configured to face towards the suction side or the pressure side of the wind turbine blade, the first surface having a leading first edge and a trailing first edge opposite the leading first edge, the first surface having a tip first edge and a root first edge opposite the tip first edge; a second surface opposite the first surface, the second surface having a leading second edge and a trailing second edge opposite the leading second edge, the second surface having a tip second edge and a root second edge opposite the tip second edge; a root side surface configured to face towards the root of the wind turbine blade and extending between the root first edge and the root second edge; and a tip side surface configured to face towards the tip of the wind turbine blade and extending between the tip first edge and the tip second edge; wherein the first surface comprises a first receptor base recess configured to receive a first receptor base for coupling with a first receptor;
  inserting the first receptor base in the first receptor base recess of the support element;
  positioning the support element in an internal cavity of the wind turbine blade between the pressure side and the suction side;
  locating a position of the first receptor base in the support element by locating a magnetic element in an orientation pocket of the support element through the pressure side and/or the suction side;
  providing a hole through the pressure side and/or the suction side to access the first receptor base located in the support element; and
  connecting the first receptor to the first receptor base through the hole.

15. A support element for a lightning protection system of a wind turbine blade extending from a root to a tip, the wind turbine blade comprising a root region, an airfoil region with the tip, a pressure side, a suction side and a chord line extending between a leading edge and a trailing edge, the support element being configured to support one or more elements of the lightning protection system, the support element comprising:
  a first surface configured to face towards the suction side or the pressure side of the wind turbine blade, the first surface having a leading first edge and a trailing first edge opposite the leading first edge, the first surface having a tip first edge and a root first edge opposite the tip first edge;
  a second surface opposite the first surface, the second surface having a leading second edge and a trailing second edge opposite the leading second edge, the second surface having a tip second edge and a root second edge opposite the tip second edge;
  a root side surface configured to face towards the root of the wind turbine blade and extending between the root first edge and the root second edge; and
  a tip side surface configured to face towards the tip of the wind turbine blade and extending between the tip first edge and the tip second edge,
  wherein the first surface comprises a first receptor base recess configured to receive a first receptor base for coupling with a first receptor of the lightning protection system, and
  wherein the support element further comprises a first orientation pocket located a predetermined distance from the first receptor base recess.

16. A support element for a lightning protection system of a wind turbine blade extending from a root to a tip, the wind turbine blade comprising a root region, an airfoil region with the tip, a pressure side, a suction side and a chord line extending between a leading edge and a trailing edge, the support element being configured to support one or more elements of the lightning protection system, the support element comprising:
  a first surface configured to face towards the suction side or the pressure side of the wind turbine blade, the first surface having a leading first edge and a trailing first edge opposite the leading first edge, the first surface having a tip first edge and a root first edge opposite the tip first edge;
  a second surface opposite the first surface, the second surface having a leading second edge and a trailing second edge opposite the leading second edge, the second surface having a tip second edge and a root second edge opposite the tip second edge;
  a root side surface configured to face towards the root of the wind turbine blade and extending between the root first edge and the root second edge;
  a tip side surface configured to face towards the tip of the wind turbine blade and extending between the tip first edge and the tip second edge; and
  a leading edge surface extending between the leading first edge and the leading second edge,
  wherein the first surface comprises a first receptor base recess configured to receive a first receptor base for coupling with a first receptor of the lightning protection system,
  wherein the leading edge surface is configured for attachment to a shear web or spar side of a spar extending between the suction side and the pressure side of the wind turbine blade, and
  wherein the support element has a tapered profile such that a thickness of the support element between the first surface and the second surface decreases in a chordal direction from the leading first and second edges to the trailing first and second edges.

17. A wind turbine blade extending from a root to a tip, the wind turbine blade comprising a root region, an airfoil region with the tip, a pressure side, a suction side and a chord line extending between a leading edge and a trailing edge, the wind turbine blade comprising the support element according to claim 16, the support element being configured to support one or more elements of the lightning protection system.

\* \* \* \* \*